(12) United States Patent
Stephan et al.

(10) Patent No.: US 8,321,544 B2
(45) Date of Patent: Nov. 27, 2012

(54) METHOD AND SYSTEM FOR THE TRANSFER OF COMMUNICATION NETWORK ADMINISTRATION INFORMATION

(75) Inventors: Emile Stephan, Pleumeur Bodou (FR); Jessie Le Moullac-Jewitt, South San Francisco, CA (US); Eric Moreau, Gif sur Yvette (FR)

(73) Assignee: France Telecom, Paris (FR)

( * ) Notice: Subject to any disclaimer, the term of this patent is extended or adjusted under 35 U.S.C. 154(b) by 1304 days.

(21) Appl. No.: 10/573,103

(22) PCT Filed: Sep. 7, 2004

(86) PCT No.: PCT/FR2004/002271
§ 371 (c)(1),
(2), (4) Date: Jul. 5, 2007

(87) PCT Pub. No.: WO2005/034429
PCT Pub. Date: Apr. 14, 2005

(65) Prior Publication Data
US 2007/0274213 A1 Nov. 29, 2007

(30) Foreign Application Priority Data
Sep. 26, 2003 (FR) ...................................... 03 11345

(51) Int. Cl.
*G06F 15/173* (2006.01)
*G06F 15/16* (2006.01)
(52) U.S. Cl. ....................................... 709/223; 709/224
(58) Field of Classification Search .......... 709/223–226, 709/246, 247, 213–219; 707/10, 100, 103; 717/107; 395/500, 600
See application file for complete search history.

(56) References Cited

U.S. PATENT DOCUMENTS

| | | | |
|---|---|---|---|
| 5,291,583 A | | 3/1994 | Bapat |
| 5,737,518 A | | 4/1998 | Grover et al. |
| 5,864,865 A | * | 1/1999 | Lakis ........................ 707/103 R |
| 2002/0078261 A1 | * | 6/2002 | Wiles et al. .................. 709/330 |
| 2002/0091809 A1 | * | 7/2002 | Menzies et al. ............... 709/223 |
| 2002/0133581 A1 | * | 9/2002 | Schwartz et al. ............. 709/223 |
| 2003/0056193 A1 | | 3/2003 | Perycz et al. |

(Continued)

OTHER PUBLICATIONS

Jeong-Hyuk Yoon, Hong-Taek Ju and James Wong. "Development of SNMP-XML translator and gateway for XML-based integrated network management," International Journal of Network management. Jul. 2003.*

(Continued)

*Primary Examiner* — Ian N Moore
*Assistant Examiner* — Thai Nguyen
(74) *Attorney, Agent, or Firm* — Drinker Biddle & Reath LLP

(57) ABSTRACT

In order to minimize a bandwidth required for the transfers of communication network administration information, said information relating to objects pertaining to hardware, software or network operation elements, catalogued in an administration information base (11) and with each of which is associated a formal language specification, the system comprises a translator module (10). The module (10) is designed to generate on the basis of the specification for each object, a pair of words the value of whose first word pertains to an indication of the object and the value of whose second word pertains to an information length of the object. The module (10) is also designed to generate one or more templates comprising an ordered set of pairs of words and an identifier, making it possible to subsequently send an ordered string of information corresponding to each template.

11 Claims, 19 Drawing Sheets

U.S. PATENT DOCUMENTS

2004/0105394 A1* 6/2004 Martinot et al. ............. 370/252
2004/0160464 A1* 8/2004 Reyna ........................ 345/854
2005/0021547 A1* 1/2005 Emaru et al. ................. 707/100

OTHER PUBLICATIONS

Takeshi Imamura, Hiroshi Maruyama. "Mapping between ASN.1 and XML", IEEE 2001.*

Claes Wikstrom. "Processing ASN.1 specifications in a declarative language." Software Engineering for Telecommunications Systems and Services, Eigth Internation Conference. Mar. 30-Apr. 1, 1992.*

Gavalas et al., "A Hybrid Centralised-Distributed Network Management Architecture," Computers and Communications, 1999. Proceedings. IEEE International Symposium on Red Sea, Egypt, Jul. 6-8, 1999, Los Alamitos, CA, USA, IEEE Comput. Soc., pp. 434-441 (Jul. 6, 1999).

* cited by examiner

Fig.8

| OID | Name | Type | L type | L Sub-type |
|---|---|---|---|---|
| 1.3.6.1.2.1.16.8.1 | bufferControlTable | SequenceOf | - | - |
| 1.3.6.1.2.1.16.8.1.1.1 | bufferControlIndex | Integer32 | 1-4 | 1-2 |
| 1.3.6.1.2.1.16.8.1.1.2 | bufferControlChannelIndex | Integer32 | 1-4 | 1-2 |
| 1.3.6.1.2.1.16.8.1.1.3 | bufferControlFullStatus | INTEGER | 1-4 | 2 |
| 1.3.6.1.2.1.16.8.1.1.4 | bufferControlFullAction | INTEGER | 1-4 | 2 |
| 1.3.6.1.2.1.16.8.1.1.5 | bufferControlCaptureSliceSize | Integer32 | 1-4 | 1-2 |
| 1.3.6.1.2.1.16.8.1.1.6 | bufferControlDownloadSliceSize | Integer32 | 1-4 | 1-2 |
| 1.3.6.1.2.1.16.8.1.1.7 | bufferControlDownloadOffset | Integer32 | 1-4 | - |
| 1.3.6.1.2.1.16.8.1.1.8 | bufferControlMaxOctetsRequested | Integer32 | 1-4 | - |
| 1.3.6.1.2.1.16.8.1.1.9 | bufferControlMaxOctetsGranted | Integer32 | 1-4 | - |
| 1.3.6.1.2.1.16.8.1.1.10 | bufferControlCapturedPackets | Integer32 | 1-4 | - |
| 1.3.6.1.2.1.16.8.1.1.11 | bufferControlTurnOnTime | TimeTicks | 1-4 | - |
| 1.3.6.1.2.1.16.8.1.1.12 | bufferControlOwner | OwnerString | 1-32 | - |
| 1.3.6.1.2.1.16.8.1.1.13 | bufferControlStatus | EntryStatus | 4 | - |

Fig.9

| | | |
|---|---|---|
| 119 | 00000000 00000010 | 00000000 00111100 |
| 120 | 00000001 01011100 | 00000000 00001101 |
| 121 | 00000000 00000001 | 00000000 00000010 |
| 122 | 00000000 00000010 | 00000000 00000010 |
| 123 | 00000000 00000011 | 00000000 00000010 |
| 124 | 00000000 00000100 | 00000000 00000010 |
| 125 | 00000000 00000101 | 00000000 00000010 |
| 126 | 00000000 00000110 | 00000000 00000010 |
| 127 | 00000000 00000111 | 00000000 00000100 |
| 128 | 00000000 00001000 | 00000000 00000100 |
| 129 | 00000000 00001001 | 00000000 00000100 |
| 130 | 00000000 00001010 | 00000000 00000100 |
| 131 | 00000000 00001011 | 00000000 00000100 |
| 132 | 00000000 00001100 | 00000000 00100000 |
| 133 | 00000000 00001101 | 00000000 00000100 |

Fig.10

| | | |
|---|---|---|
| 99 | 00000001 01011100 | 00000000 01001000 | 100
| 101 | 00000000 00100010 | 00000010 10001101 | 102
| 103 | 00000000 00000010 | 00000010 00011110 | 104
| 105 | 00000010 00000000 | 00000000 11001000 | 106
| 107 | 00000000 00000000 00000000 00100000 | |
| 108 | 00000101 11110101 11100001 00000000 | |
| 109 | 00000000 00001111 01000010 01000000 | |
| 110 | 00000000 00000000 00100111 00010000 | |
| 111 | 11001101 11101011 10000101 01001100 | |
| 112 | a    c    m    e | |
| 113 | 00000000 00000000 00000000 00000011 | |

Fig.11

| OID | Name | Type | L type | L Sub-type |
|---|---|---|---|---|
| 1.3.6.1.2.1.37.1.12 | Aal5VccTable | SequenceOf | - | - |
| 1.3.6.1.2.1.2.1.1.1 | ifindex | INTEGER | 1-4 | - |
| 1.3.6.1.2.1. 37.1.12.1.1 | Aal5VccVpi | AtmVpIdentifier | 1-4 | 1-2 |
| 1.3.6.1.2.1. 37.1.12.1.2 | Aal5VccVci | AtmVpIdentifier | 1-4 | 1-2 |
| 1.3.6.1.2.1. 37.1.12.1.3 | Aal5VccCrcErrors | Counter32 | 1-4 | - |
| 1.3.6.1.2.1. 37.1.12.1.4 | Aal5VccTimeOuts | Counter32 | 1-4 | - |
| 1.3.6.1.2.1. 37.1.12.1.5 | Aal5VccOverSizedSDUs | Counter32 | 1-4 | - |

Fig.12

| | | |
|---|---|---|
| 79 | 00000000 00000000 | 00000000 00100000 |
| 80 | 00000001 00101111 | 00000000 00000110 |
| 81 | 00000000 00000001 | 00000000 00000100 |
| 82 | 00000000 00000010 | 00000000 00000010 |
| 83 | 00000000 00000011 | 00000000 00000010 |
| 84 | 00000000 00000100 | 00000000 00000100 |
| 85 | 00000000 00000101 | 00000000 00000100 |
| 86 | 00000000 00000110 | 00000000 00000100 |

Fig.13

| | | | |
|---|---|---|---|
| 199 | 00000001 01011100 | 00000000 00011000 | 200 |
| 201 | 00000000 00000000 00000000 00001100 | | |
| 202 | 00000000 01100100 | 00000011 11101000 | 203 |
| 204 | 00000000 00000000 00111100 01001000 | | |
| 205 | 00000000 00000000 00000001 11001000 | | |
| 206 | 00000000 00000000 00000010 00110111 | | |

| | | |
|---|---|---|
| 139 | 2 | 36 |
| 140 | 304 | 7 |
| 141 | 1 | 32 |
| 142 | 2 | 4 |
| 143 | 3 | 4 |
| 144 | 4 | 4 |
| 145 | 5 | 4 |
| 146 | 6 | 8 |
| 147 | 7 | 4 |

Fig.15

| | | |
|---|---|---|
| 149 | 304 | 64 | 150
| 151 | FTRD | |
| 152 | 5 | |
| 153 | 6 | |
| 154 | 123 | |
| 155 | 1057582058 | |
| 156 | 4578845678 | |
| 157 | 567 | |

Fig.16

METHOD AND SYSTEM FOR THE TRANSFER OF COMMUNICATION NETWORK ADMINISTRATION INFORMATION

CROSS-REFERENCE TO RELATED APPLICATIONS

This application is the U.S. national phase of the International Patent Application No. PCT/FR2004/002271 filed Sep. 7, 2004, which claims the benefit of French Application No. 03 11345 filed Sep. 26, 2003, the entire content of which is incorporated herein by reference.

FIELD OF THE INVENTION

The field of the invention is that of the administration of communication networks. The term administration is to be taken here in its widest sense, that is to say it relates both to configuration and management, or even to the control of the equipment of communication networks.

BACKGROUND OF THE INVENTION

To configure an item of equipment, it is for example possible to use an interactive interface protocol such as the known TELNET protocol. This protocol is standardized but the data accessible are not. This poses a problem, in particular in respect of a considerable amount of network equipment as is often the case.

Among other things, management comprises the prediction and detection of faults. In the known state of the art, mention may be made by way of example of document WO 02/46928 which discloses a system which processes information obtained from sensors associated with variables catalogued in an administration information base named MIB (Management Information Base). To allow its interpretation and large-scale processing in relation to numerous items of equipment, the definitions of the variables are specified by means of a standardized language named SMI (Structure of Management Information). A protocol named SNMP (Simple Network Management Protocol), likewise standardized, makes it possible to access the variables by exchanging queries/responses between equipment of the network.

As is the case for example in document WO 02/17094, the variables may relate to devices which are rather sensors of temperature, alarm states or IP type network addresses than more complex equipment. For such devices, one then speaks of objects catalogued in one or more various MIBs. This document discloses means for interfacing the devices under SNMP.

The technique based on the SNMP/SMI/MIB trio has reached a certain degree of maturity. The specifications of the MIBs themselves and also those of the objects catalogued therein, are specified both in terms of semantics and size. The formulation of the MIBs is fine-tuned, possibly by means of automated handlers such as those proposed for example in document U.S. Pat. No. 6,009,431. The absolute identification of the objects by the standards (X208 and X209), the absolute identification of the instances of objects by the instance index, imply that the MIBs provide a normative benchmark prized by operators. The SNMP protocol is widely used for numerous types of equipment and services such as attested to by documents WO 01/44924, EP 115 8720 or else WO 02/47322.

However, the SNMP protocol is not satisfactory for transporting a sizeable volume of data since it adds a considerable overhead in terms of additional information. The queries/responses mode (polling) makes it difficult to optimize the internal management of the data in the network equipment. The growth in the communication throughput of equipment is augmenting the risk of mantissa overshoot in computers with the cascade effect of consequently increasing the frequency of queries/responses that is required in order to avoid this overshoot of mantissas. The exchanging of the identifiers of instances between machines, considerably increases the bandwidth required, to a first approximation by a factor of three, to the detriment of the useful bandwidth for the data of the users. Although approximately 85% of the objects of the MIBs are fields of tables, although approximately 99.9% of the instances are instances of these objects, that is to say of fields of tables, the SNMP protocol does not optimize the consultation of the tables. While the fields of a table row have the same index, the SNMP protocol repeats the index for each field, thus adding an extra throughput of around one hundred bytes per table row consulted.

OBJECTS OF THE INVENTION

An object of the invention is a method for minimizing a bandwidth required for the transfers of communication network administration information, said information relating to objects pertaining to hardware, software or network operation elements, catalogued in an administration information base and with each of which is associated a formal language specification.

SUMMARY OF THE INVENTION

The method is noteworthy in that it comprises steps consisting in:
  generating on the basis of said specification for each object, a pair of words the value of whose first word pertains to an indication of the object and the value of whose second word pertains to an information length of the object;
  constructing a template comprising an ordered set of pairs of words generated and an identifier of said template, making it possible to subsequently send an ordered string of information corresponding to said template.

More particularly, the method comprises steps consisting in:
  traversing a tree of the administration information base each node of which is associated with an object;
  testing at each node whether the object is of scalar or table type;
  constructing the template by appending the word pair generated to the template if the object is of scalar type;
  constructing another so-called table template if the object is of table type for the objects of the table.

Advantageously, the method comprises steps consisting in constructing in addition a configuration template comprising the pairs of words generated for objects with modifiable access.

An object of the invention is also a system for minimizing a bandwidth required for the transfers of communication network administration information, said information relating to objects pertaining to hardware, software or network operation elements, catalogued in an administration information base and with each of which is associated a formal language specification.

The system is noteworthy in that it comprises a translator module designed to generate on the basis of said specification for each object, a pair of words the value of whose first word pertains to an indication of the object and the value of whose second word pertains to an information length of the object and to generate a template comprising an ordered set of pairs of words and an identifier, making it possible to subsequently send an ordered string of information corresponding to said template.

More particularly, the translator module is designed to traverse a tree of the administration information base each node of which is associated with an object, so as to test at each node whether the object is of scalar or table type and to construct the template by appending the word pair generated to the template if the object is of scalar type or construct another so-called table template if the object is of table type for the objects of the table.

Advantageously, the translator module is designed to construct in addition a configuration template comprising the pairs of words generated for objects with modifiable access.

For example, the system comprises a supervisor module designed to collect measurements and an exportation module designed to transmit at least one ticket of data pertaining to these measurements to a server, preceding it with the template of this data ticket.

BRIEF DESCRIPTION OF THE DRAWINGS

The invention will be better understood on the basis of the exemplary implementation described hereinbelow with reference to the appended drawings, in which:

FIG. 8 represents a tree structure for a particular object of table type;

FIG. 9 shows a template of the object represented in FIG. 8;

FIG. 10 shows an exemplary data ticket, in accordance with the template of FIG. 9;

FIG. 11 represents a tree structure for another particular object of table type;

FIG. 12 shows a template of the object represented in FIG. 11;

FIG. 13 shows an exemplary data ticket, in accordance with the template of FIG. 12;

FIG. 15 shows a table template generated by the system of FIG. 14;

FIG. 16 shows an exemplary data ticket, in accordance with the template of FIG. 15;

MORE DETAILED DESCRIPTION

Figure 1:
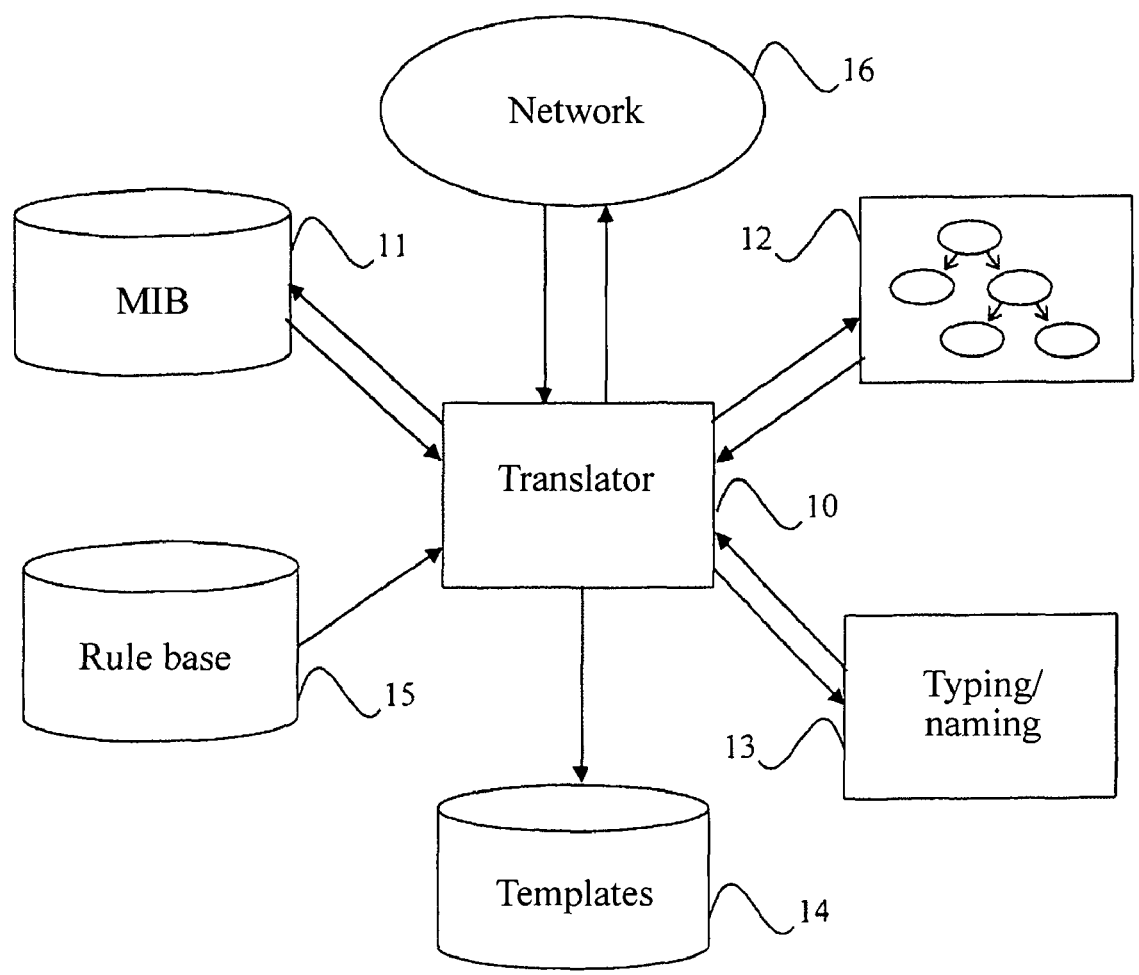
FIG. 1 is a system diagram in accordance with the invention.

In the system described hereinbelow with reference to 1, a translator 10 comprises means of communication with a network 16 with a view to receiving commands and to transmitting data. The translator 10 is a machine such as for example a computer comprising a processor and programs required for implementing the method steps described later with reference to FIGS. 2 to 6. The translator 10 comprises means of reading from databases 11 and 15, means of writing to a mass memory 14, means of reading and of writing from and to a memory 12 and means of access to a module 13.

The database 11 contains specifications of administration information bases (MIB standing for Management Information Base or PIB standing for Process Information Base).

The database 15 contains translation rules for each providing a template field type to at least one object specified in the database 11.

The memory 14 is designed to contain templates generated by the translator 10.

The memory 12 is designed to contain trees pertaining to MIB or PIB objects.

The module 13 is designed to perform a typing/naming of objects communicated by the translator 10. The module 13 is furnished with a processor and with programs required to implement the method steps described later with reference to FIG. 7.

Figure 2:
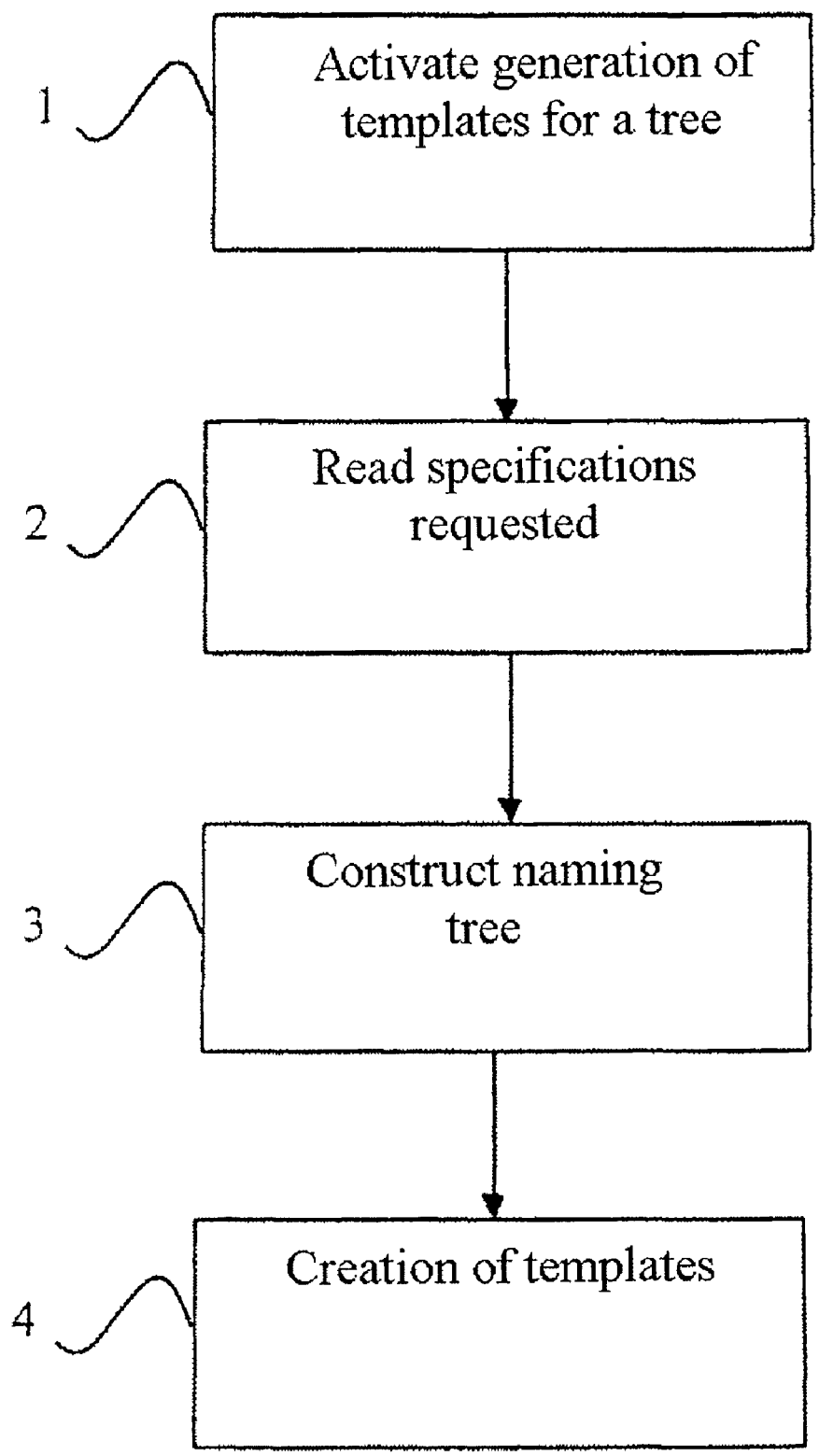
FIGS. 2 to 7 show method steps in accordance with the invention.

With reference to FIG. 2, a first step 1 consists in activating in the translator 10, a generation of templates for a tree by associating therewith a parameter named "ObjectRoot". The tree can point to a set of MIBs or of PIBs, to one MIB, a subtree of an MIB or a table of an MIB. The activation may be done on demand or within the framework of the initialization of the system on the basis of the network 16. The activation provides a base for numbering the templates which is a parameter named "base_template_ID". It will naturally be understood that the names given between quotation signs in the description are simply chosen by way of mnemotechnic memorization without any particular significance and with no limitative value, that is to say that any other name may be chosen without departing from the framework of the invention, the names chosen for the description always of course designating the same data as is the case in respect of the references to the drawings. The activation also provides a parameter pertaining to a generation of configuration templates, and here named "Generation_templates_configuration". When the value of this parameter is set for example to 0, this signifies that the method should generate only standard templates, that is to say those essentially geared towards monitoring and signalling. When the value of this parameter is set for example to 1, this signifies that the method should generate in addition configuration templates, that is to say geared essentially towards the configuration of the equipment. A standard template pertains to all the objects and indexes of the tree considered while a configuration template pertains to the indexes, to write-accessible objects and to object creation.

A second step 2 consists in reading the specifications of the MIBs or PIBs requested, in the memory 11. This memory may be any type of memory (random access memory, disk or network). This step is optional. It is not necessary if the specifications are already available in the translator 10. This step may be repeated during processing if necessary.

A third step 3 consists in constructing a tree for naming the objects on the basis of the values of the identifiers of objects contained in the MIBs or PIBs.

This step is optional if the tree is already present in the translator 10. To construct the objects naming tree, the translator 10 reads the specifications of the models of data written in the SMI language in the MIBs or PIBs, interprets each clause of the definition of each object so as to place each object in the naming tree using the OIDs of the objects. It is recalled that an object identifier (OID) is a particular type of the language ASN.1[X208] using a unique tree defined so as to associate a portable identifier with a data item. This identifier is absolute and transferable. The transfer function commonly used is defined in [X209]. For example SNMP uses the encoding rules of X209. X209 is often named BER (Basic Encoding Rules).

Figure 3A:
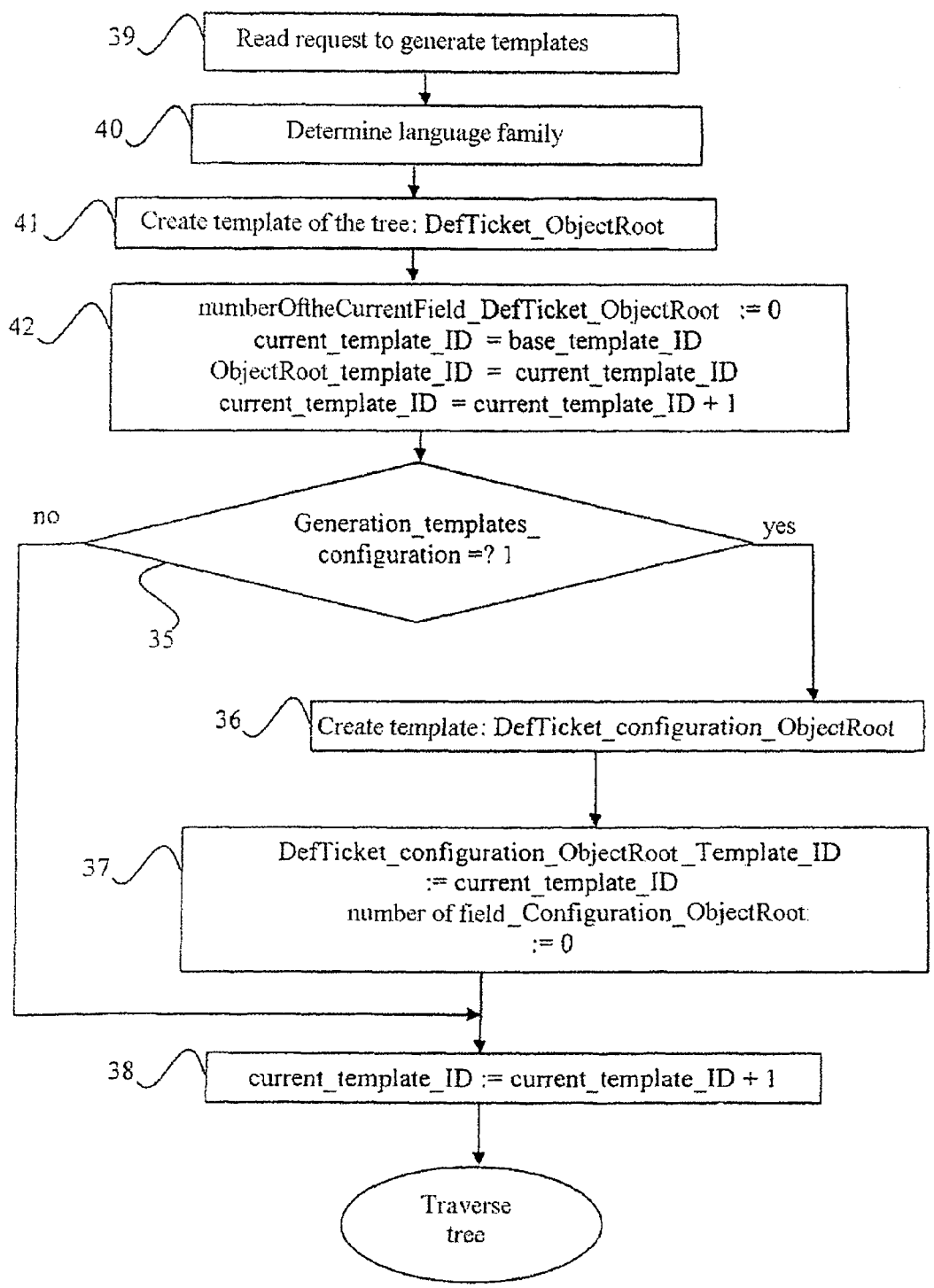
Figure 3B:
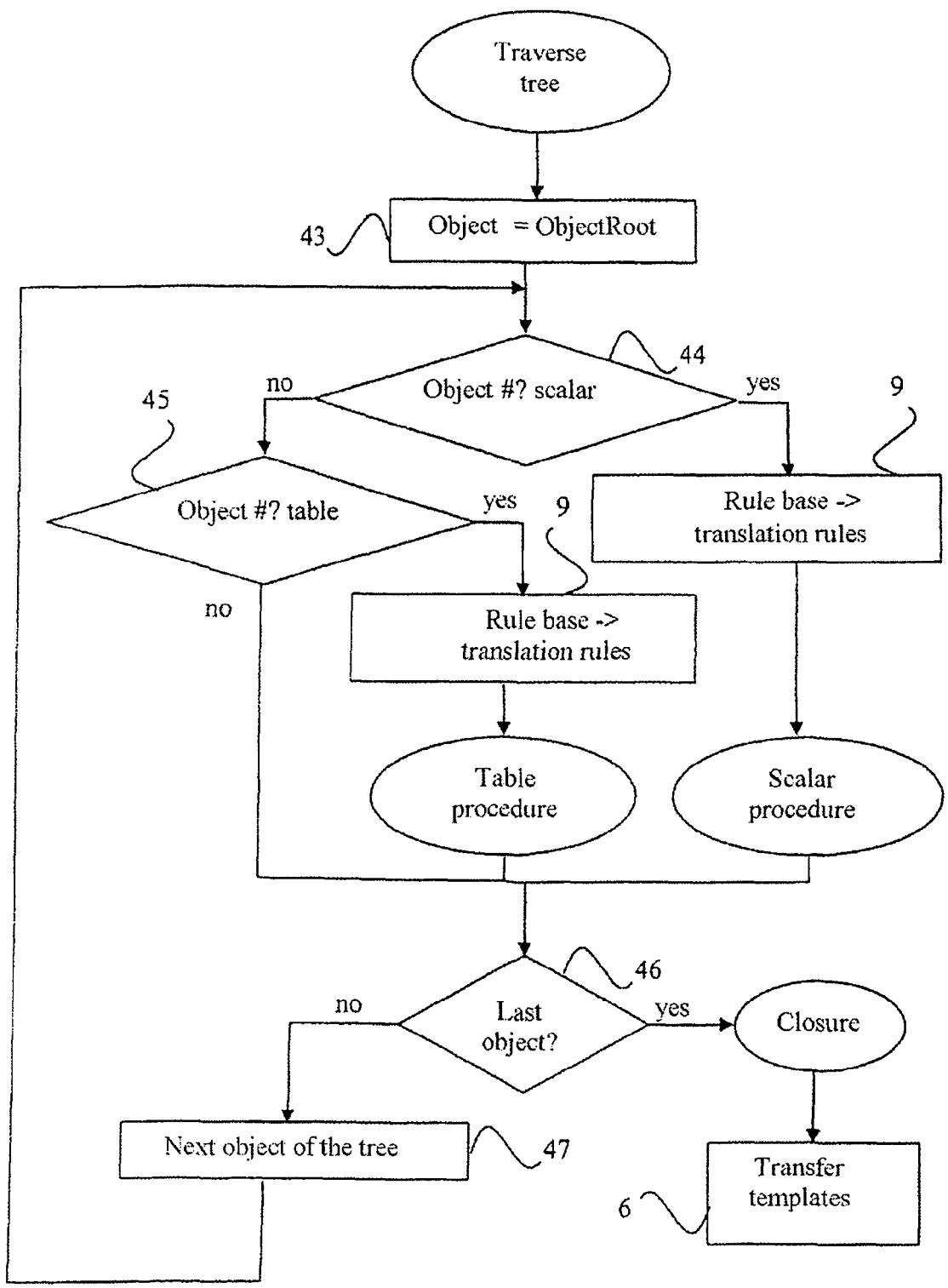

In a fourth step 4, the translator 10 creates templates by executing the steps described hereinbelow with reference to FIGS. 3a and 3b.

A step 39 consists in reading the templates generation request activated in step 1 in respect of the objects present of the tree of the "ObjectRoot" object and in reading the templates numbering base parameter "base_template_ID".

A step 40 consists in creating one or more constants which make it possible to distinguish families of templates according as a template pertains to an MIB, a PIB, or to another specification language family. In the example of FIG. 3a, a constant pertaining to an MIB, is named "DefinitionOfTemplateOf MIB" to which is assigned a value two which is common to all MIB templates. Other constants may be allocated with other values signifying that the structure constructed in the subsequent steps is a PIB or other template.

A step 41 consists in creating a "DefTicket_ObjectRoot" template for this tree. The template is an initially empty list of pairs for example of sixteen-bit words.

A step 42 consists in creating a "NumberOftheCurrentField_DefTicket_ObjectRoot" variable and in assigning it a zero value, in creating a "current_template_ID" variable and in assigning it the value of the "base_template_ID" parameter, in creating a "ObjectRoot_template_ID" variable and in assigning it the value of "current_template_ID", and finally in incrementing the value of the "current_template_ID" variable. The first variable serves to number the data fields which will be appended progressively in the subsequent steps to construct a template. The second variable serves to number the various templates which will be created in the subsequent steps so that the template of the tree itself is numbered with the third variable whose value is that of the base parameter provided in step 1. The second variable is finally incremented in such a way as to be available with a new value for another template generated in the subsequent steps on the basis of the objects of the tree.

Following steps 41 and 42 of standard template creation, a step 35 consists in testing whether the "Generation_templates_configuration" parameter equals 1. A positive response to the test triggers steps 36 and 37 for creating a configuration template in parallel with the standard template. As we shall see hereinafter, a configuration template relates only to modifiable objects from among those of the standard template. The lesser size which results therefrom, reduces the information streams necessary during configuration so as to accelerate the running thereof. The purpose of a standard template is to dispatch the values of the variables in their existing state, generally doing so from the place of measurement to the place of processing. A configuration template for its part, is used to fix values of variables, or even to create new measurements in the measurement system, its direction of flow is generally from the place of management to the place of measurement.

Step 36 of the same nature as step 41, consists in creating a configuration template named "DefTicket_configuration_ObjectRoot".

Step 37, of the same nature as step 42, consists in creating a variable named "DefTicket_configuration_ObjectRoot_Template_ID" and in assigning it the value of "current_template_ID" as well as in creating a variable named "NumberOfFields_Configuration_ObjectRoot" and in assigning it a zero value. The first configuration variable serves to number the configuration template directly following the standard template. The second configuration variable serves to count the NumberOfFields of the configuration template which is less than or equal to the NumberOfFields of the standard template.

Following steps 36 and 37, a step 38 consists in incrementing the "current_template_ID" variable so as to identify a possible subsequent creation of a template. Step 38 is also activated in case of negative response to the test of step 35 so that the "current_template_ID" variable is incremented independently of the fact that a configuration template is or is not created. Thus, each standard template will have an identifier of the same nature, for example even, and the corresponding configuration template will have a following number identifier, thus of odd nature which makes it possible on faith to distinguish the nature of the template and to match same.

An initially empty standard template and respectively if commanded by step 1, an initially empty configuration template, that were created by steps 41 and 42, respectively by steps 36 and 37, the method continues after step 38, via a procedure for traversing the tree, described hereinbelow with reference to FIG. 3b.

A succession of steps 43 to 47 consists in scanning the tree contained in the memory 12, commencing with the "ObjectRoot" root.

Step 43 consists in initializing a current object to the root object.

Step 44 consists in testing whether the object is an object of scalar type. An MIB contains two categories of objects, the individual objects also called scalars and the tables grouping together objects in rows, each row being identified by an index. A positive response to the test of step 44 triggers a scalar procedure. A negative response to the test of step 44 triggers a step 45.

Step 45 consists in testing whether the object is of table type. A positive response to the test of step 45 triggers a table procedure. A negative response to the test of step 45 triggers directly step 47 described later. The table procedure and the scalar procedure will be described later respectively with reference to FIGS. 4 and 5.

As a preamble to the execution of one of the table or respectively scalar procedures, a step 9 consists in extracting table or respectively scalar object translation rules, from the rule base 15.

After execution of the table procedure or of the scalar procedure as the case may be, a step 46 tests whether the current object is the last object of the tree. A positive response to the test of step 46 triggers a closure procedure described later with reference to FIG. 6. A negative response to the test of step 46 triggers a step 47. Step 47 takes the next object of the tree as current object and loops the execution of the method back to step 44.

After execution of the closure procedure, a step 6 transfers the templates generated by the method to respond to a query originating from the network 16, directly from another item of equipment or internally.

Figure 4A:
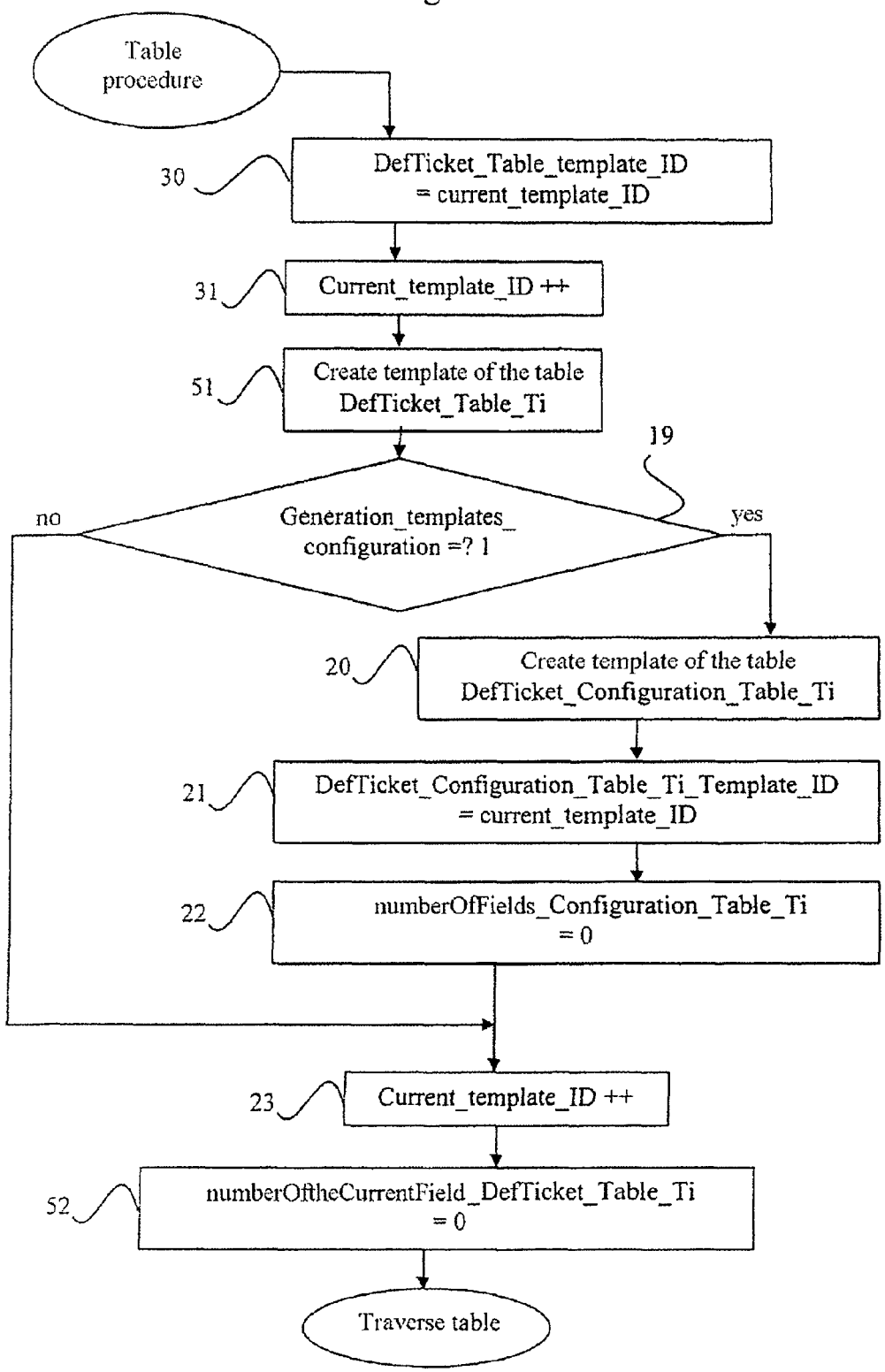

With reference to FIG. 4a, the table procedure begins with a step 30 in which a variable named "DefTicket_Table_template_ID" is created and to which is assigned the current value of "current_template_ID". This variable serves as identifier of a standard template of the table detected in step 44.

In a step 31, the value of "current_template_ID" is incremented, so as to be available for a possible subsequent creation of a template.

A step 51 then consists in creating a template of the table, named DefTicket_Table_Ti. In the same way as the template of the tree created in step 41, the template of the table created in step 51, is an initially empty list.

Following steps 30, 31 and 51 of standard template creation, a step 19 consists in testing whether the "Generation_templates_configuration" parameter equals 1. A positive response to the test triggers steps 20 to 22 for creating a configuration template in parallel with the standard template. As we shall see hereinafter, a configuration template relates only to modifiable objects among those of the standard template. The lesser size which results therefrom reduces the information streams necessary during configuration so as to accelerate the running thereof.

Step 20 of the same nature as step 51 consists in creating a configuration template named "DefTicket_configuration_Table_Ti".

Step 21, of the same nature as step 30, consists in creating a variable named "DefTicket_configuration_Table_Ti_Template_ID" and in assigning it the value of "current_template_ID".

Step 22 consists in creating a variable named "NumberOfFields_Configuration_Table_Ti" and in assigning it a zero value.

The variable created and set in step 21, serves to number the configuration template directly following the standard template. The variable created and set in step 22 serves to count the NumberOfFields of the configuration template which is less than or equal to the NumberOfFields of the standard template.

Following steps 20 to 22, a step 23 consists in incrementing the "current_template_ID" variable to identify a possible subsequent creation of a template. Step 23 is also activated in case of negative response to the test of step 19 so that the "current_template_ID" variable is incremented independently of the fact that a configuration template is or is not created. Thus, each standard template will have an identifier of the same nature, for example even, and the corresponding configuration template will have a following number identifier, thus of odd nature which makes it possible on faith to distinguish the nature of the template and to match same.

A step 52 consists in creating a local variable named "NumberOftheCurrentField_DefTicket_Table_Ti" and in assigning it a zero value. Step 52 is executed either following step 51 or following step 23, the current field number serving both to index the data fields of the standard table template and to compute the quantity thereof.

Figure 4B:
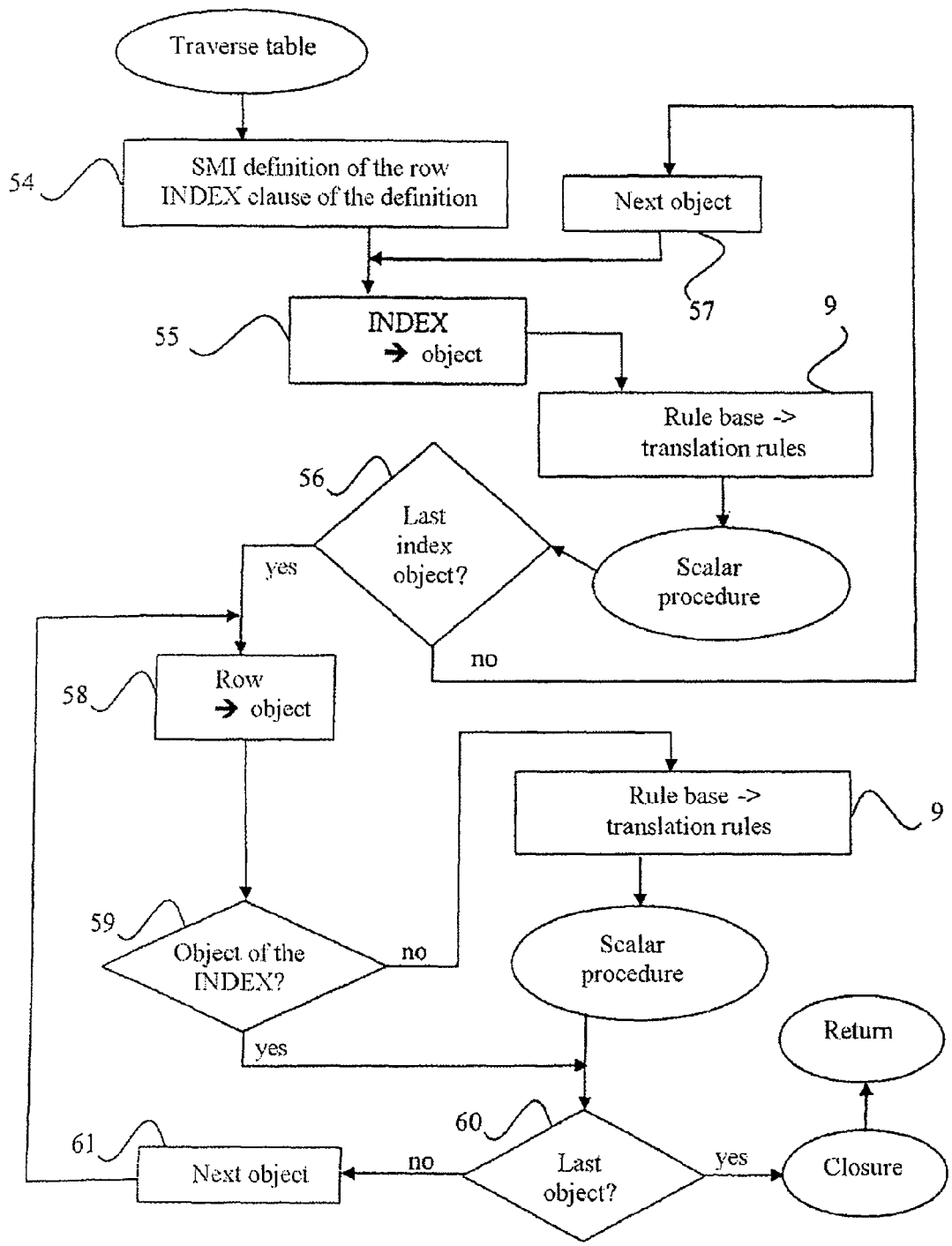

An initially empty standard template and if commanded by step 1, respectively an initially empty configuration template, that were created by steps 30, 51 and 52, respectively by steps 20 to 22, the method continues with a table traversal procedure, described hereinafter with reference to FIG. 4b.

In a step 54, the translator 10 reads the SMI definition of the entry row of the table and the INDEX clause of the definition.

A loop of steps 55 to 57 consists thereafter in sequentially reading the definition SMI of each object of the index. In step 55, the translator 10 reads an object of the index beginning with the first object following the execution of step 54. The translator 10 then triggers the scalar procedure for the object read in step 55 after having triggered as a preamble step 9 to extract the translation rules if they exist, for this object from the rule base 15. The step 9 is in fact optional.

Step 56 consists in testing whether the current object is the last object of the index. A negative response to the test loops the process back to step 57 for the next object of the index so as to iteratively repeat step 55. A positive response to the test of step 56 indicates that all the objects of the index have been processed.

After the last execution of step 56, a loop of steps 58 to 61 consists in processing the objects of the table which are not part of the index.

In step 58, the translator 10 reads a row object beginning with the first object of the definition of the table row after the last execution of step 56.

In step 59, the translator 10 tests whether the current object is an object of the index. A negative response to the test triggers after execution of step 9 for the current object, the scalar procedure following which step 60 is activated. A negative response to the test of step 59 triggers step 60 directly.

In step 60, the translator 10 tests whether the current object is the last object of the table. A negative response to the test of step 60 triggers step 61 in which the translator 10 reactivates step 58 for the next object of the table. A positive response to the test of step 60 triggers the closure procedure which will be described later with reference to FIG. 6.

Figure 5:
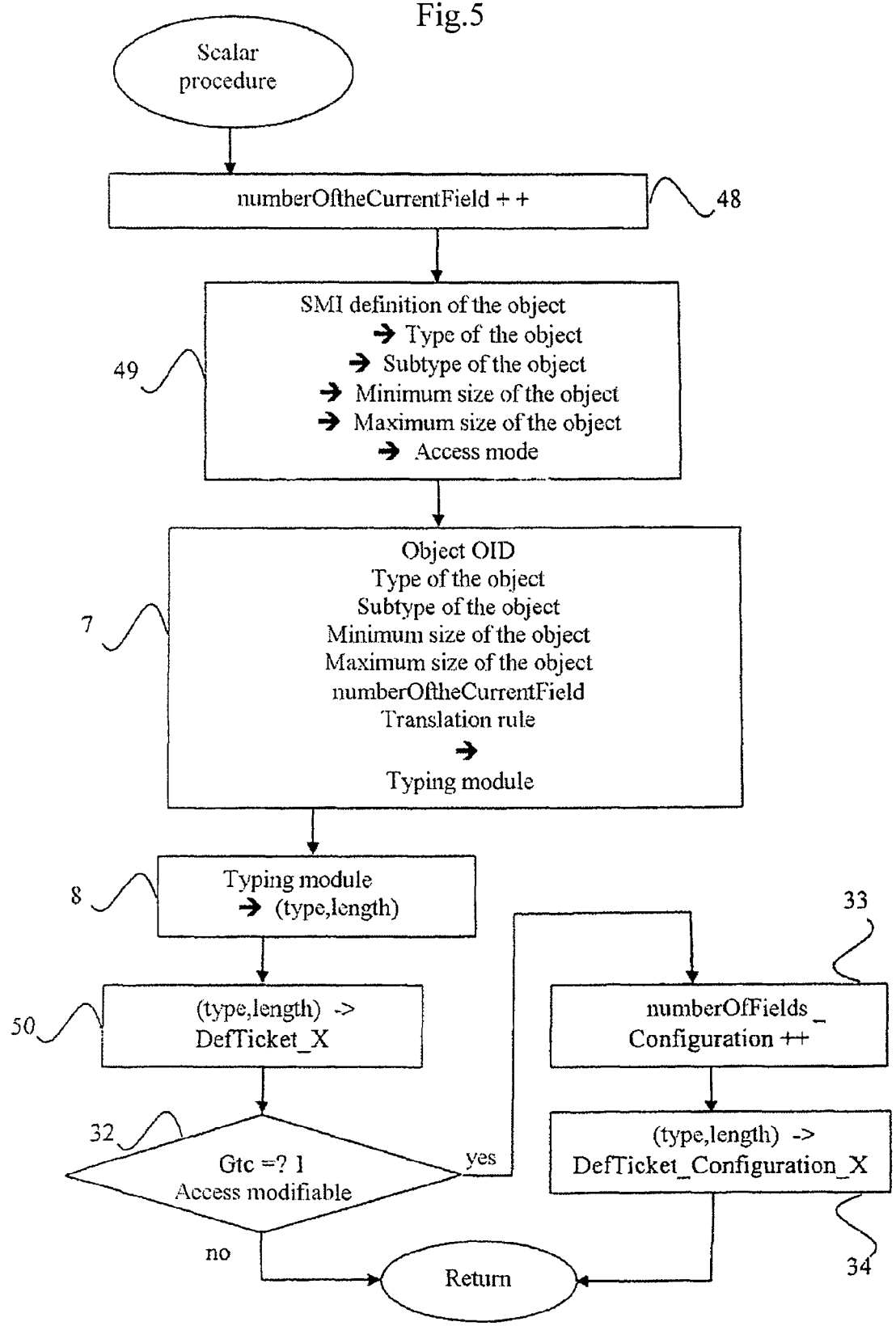

The scalar procedure is now described with reference to FIG. 5. In a step 48, a value named "NumberOftheCurrentField" constitutes a call parameter of the scalar procedure. Thus, when the scalar procedure is triggered from step 44, the "NumberOftheCurrentField" variable corresponds to the "NumberOftheCurrentField_DefTicket_ObjectRoot" variable. When the scalar procedure is triggered from step 55 or step 59, the "NumberOftheCurrentField" variable corresponds to the "NumberOftheCurrentField_DefTicket_Table_Ti". Step 48 increments the value of the "NumberOftheCurrentField" variable.

In step 49, the translator 10 reads the SMI definition of the object so as to extract therefrom its type, its subtype, its minimum size, its maximum size and its access mode. The access mode makes it possible to distinguish whether the current object is or is not modifiable.

In a step 7, the translator 10 transmits the type of the object, the subtype of the object, the minimum size of the object, the maximum size of the object, the NumberOftheCurrentField and the translation rule for the current object to the naming typing module 13.

In a step 8, the typing module 13 transmits the values of a pair (type, length) relating to the current object to the translator 10.

In a step 50, the translator 10 appends the pair (type, length) to the template named locally DefTicket_X which is either DefTicket_ObjectRoot if the scalar procedure was triggered from step 44, or the DefTicket_Table_Ti template if the scalar procedure was triggered from step 55 or step 59.

After execution of step 50, the translator 10 activates a test step 32 which consists in verifying whether a configuration template is created, that is to say whether "Generation_templates_configuration", Gtc for short, equals 1 and in verifying whether the current object is modifiable.

A positive response to the test of step 32 triggers a step 33 in which a locally named variable "NumberOfFields_Configuration" is incremented. The "Number of the fields_Configuration" variable corresponds either to the "NumberOfFields_Configuration_ObjectRoot" variable if the scalar procedure was triggered from step 44, or to the "NumberOfFields_Configuration_Table_Ti" variable if the scalar procedure was triggered from step 55 or step 59.

In a step 34, the translator 10 appends the pair (type, length) to the locally named template DefTicket_Configuration_X which is either DefTicket_Configuration_ObjectRoot if the scalar procedure was triggered from step 44, or the DefTicket_Configuration_Table_Ti template if the scalar procedure was triggered from step 55 or step 59. It is seen that the pair (type, length) is appended to the configuration template, with the same tag as in the standard template, namely the current field number. Thus, each field pertaining to the type and to the length of one and the same object, is tagged in an identical manner in the standard template and the configuration template, thus facilitating the processing of the data by equipment using the method.

After execution of step 34 or following a negative response to the test of step 32, the scalar procedure terminates with a return so as to continue the execution of the method at step 46 if the scalar procedure was triggered from step 44, at step 56 if the scalar procedure was triggered from step 55 or at step 60 if the scalar procedure was triggered from step 59.

Figure 6:
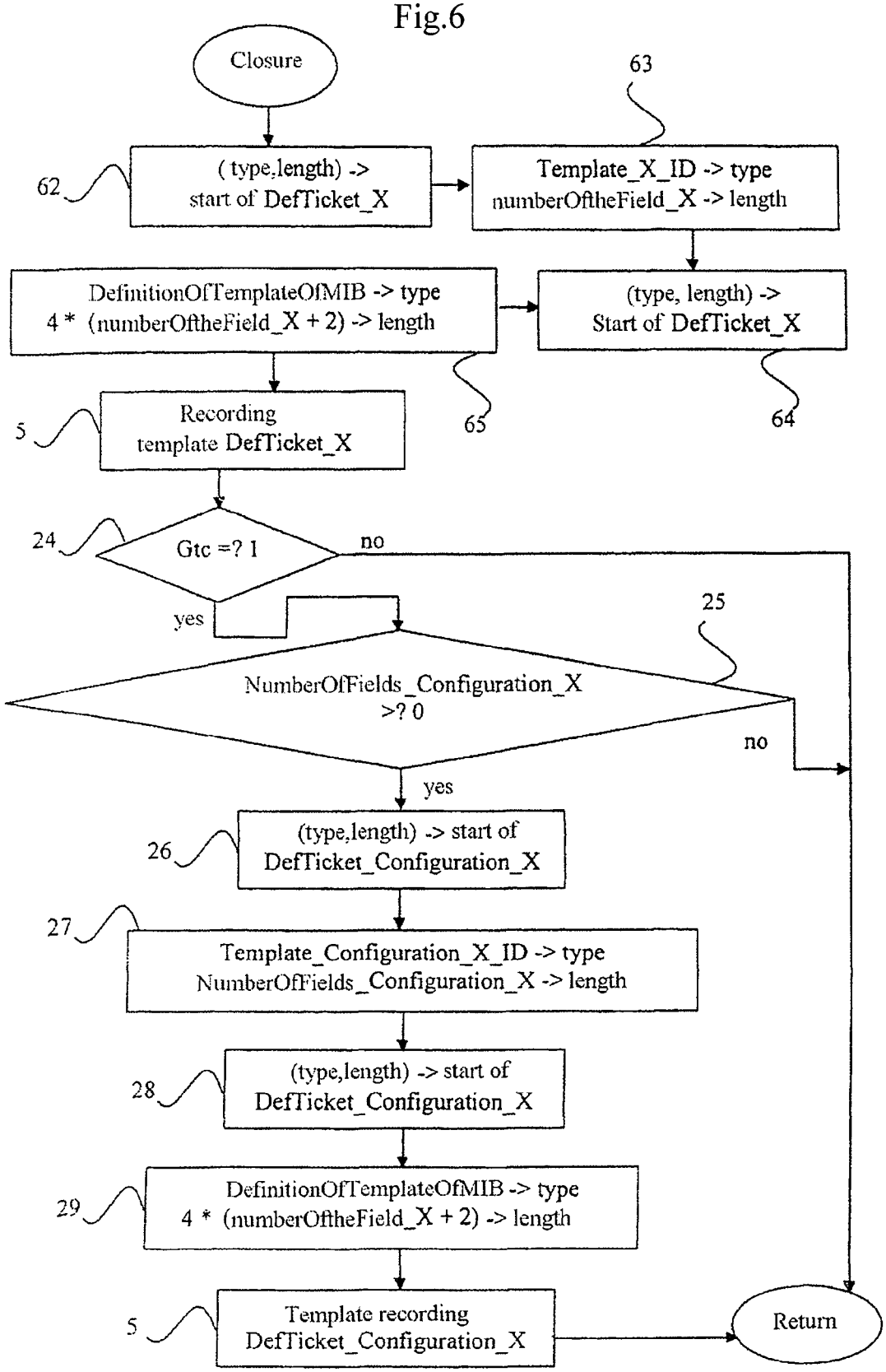

The closure procedure is described hereinafter with reference to FIG. 6.

In a step 62, the translator 10 inserts a definition of an element consisting of a pair (type, length) at the start of the template whose local name DefTicket_X corresponds to the name DefTicket_ObjectRoot if the procedure is triggered from step 46 and to the name DefTicket_Table_Ti if the closure procedure is triggered from step 60.

In a step 63, the translator 10 assigns the value of the locally named variable "Template_X_ID" to the first term and the NumberOftheCurrentField to the second term of the definition of the element inserted at step 62. As previously, X is replaced by "ObjectRoot" or "Table_Ti" depending on the call case of the procedure. The type value assigned to the first term constitutes an identifier of the template from among the standard templates created. The number of the field assigned to the second term, gives a template length, expressed as a quantity of fields each corresponding to a pair (type, length) pertaining to an object processed in the scalar procedure or in the table procedure as the case may be.

In a step 64, the translator 10 inserts an element definition consisting of a pair (type, length) at the start of the template which results from step 62 and whose name DefTicket_X corresponds to the same template name as in step 62.

In a step 65, the translator 10 assigns the value of the template definition constant of step 40, to the first term of the definition of the element inserted at step 64. The value 2 for example, indicates that the string of pairs generated, is am MIB template. The translator 10 appends 2 to the NumberOftheCurrentField so as to take account of the two fields each corresponding respectively to the pair inserted at step 62 and to the pair inserted at step 64. When each term of pair is constituted for example of a two-byte word, the translator 10 multiplies the result previously obtained by four so as to obtain a template length expressed in bytes which is then assigned to the second term of the pair inserted at step 64.

In a step 5, the translator 10 records the standard template thus obtained in the mass memory 14.

A step 24 consists in testing whether a configuration template creation was requested, that is to say whether the parameter Gtc for short, is equal to 1. A negative response causes the immediate return of the procedure, no configuration template needing to be created.

A positive response to the test of step 24 triggers a second test step 25 which consists in testing whether the number of configuration fields is positive. A negative response to the test causes the return of the procedure since when no object scanned for the configuration template is modifiable, the NumberOfFields remains zero and there is then no reason to record a configuration template.

A positive response to the test of step 25 triggers a string of steps 26 to 29 which terminates with step 5 for recording a configuration template before the procedure return, it being noted that there exists at least one field corresponding to a modifiable object.

In step 26, the translator 10 inserts a definition of an element consisting of a pair (type, length) at the start of the template whose local name DefTicket_Configuration_X corresponds to the name DefTicket_Configuration_ObjectRoot if the procedure is triggered from step 46 and to the name DefTicket_Configuration_Table_Ti if the closure procedure is triggered from step 60.

In step 27, the translator 10 assigns the value of the locally named variable "Template_Configuration_X_ID" to the first term and the current NumberOfFields to the second term of the definition of the element inserted at step 26. As previously, X is replaced by "ObjectRoot" or "Table_Ti" depending on the call case of the procedure. The type value assigned to the first term constitutes an identifier of the template from among the configuration templates created. The NumberOfFields that is assigned to the second term gives a template length, expressed as a quantity of fields each corresponding to a pair (type, length) pertaining to an object processed in the scalar procedure or in the table procedure as the case may be.

In step 28, the translator 10 inserts an element definition consisting of a pair (type, length) at the start of the template which results from step 27 and whose name DefTicket_Configuration_X corresponds to the same template name as in step 26.

In step 29, the translator 10 assigns the value of the template definition constant of step 40, to the first term of the definition of the element inserted at step 64. The value 2 for example, indicates that the string of pairs generated, is an MIB template. The translator 10 appends 2 to the NumberOftheCurrentField so as to take account of the two fields each corresponding respectively to the pair inserted at step 26 and to the pair inserted at step 28. When each term of pair is constituted for example of a two-byte word, the translator 10 multiplies the result previously obtained by four so as to obtain a template length expressed in bytes which is then assigned to the second term of the pair inserted at step 64.

In step 5, the translator 10 records the configuration template thus obtained in the mass memory 14.

Figure 7:
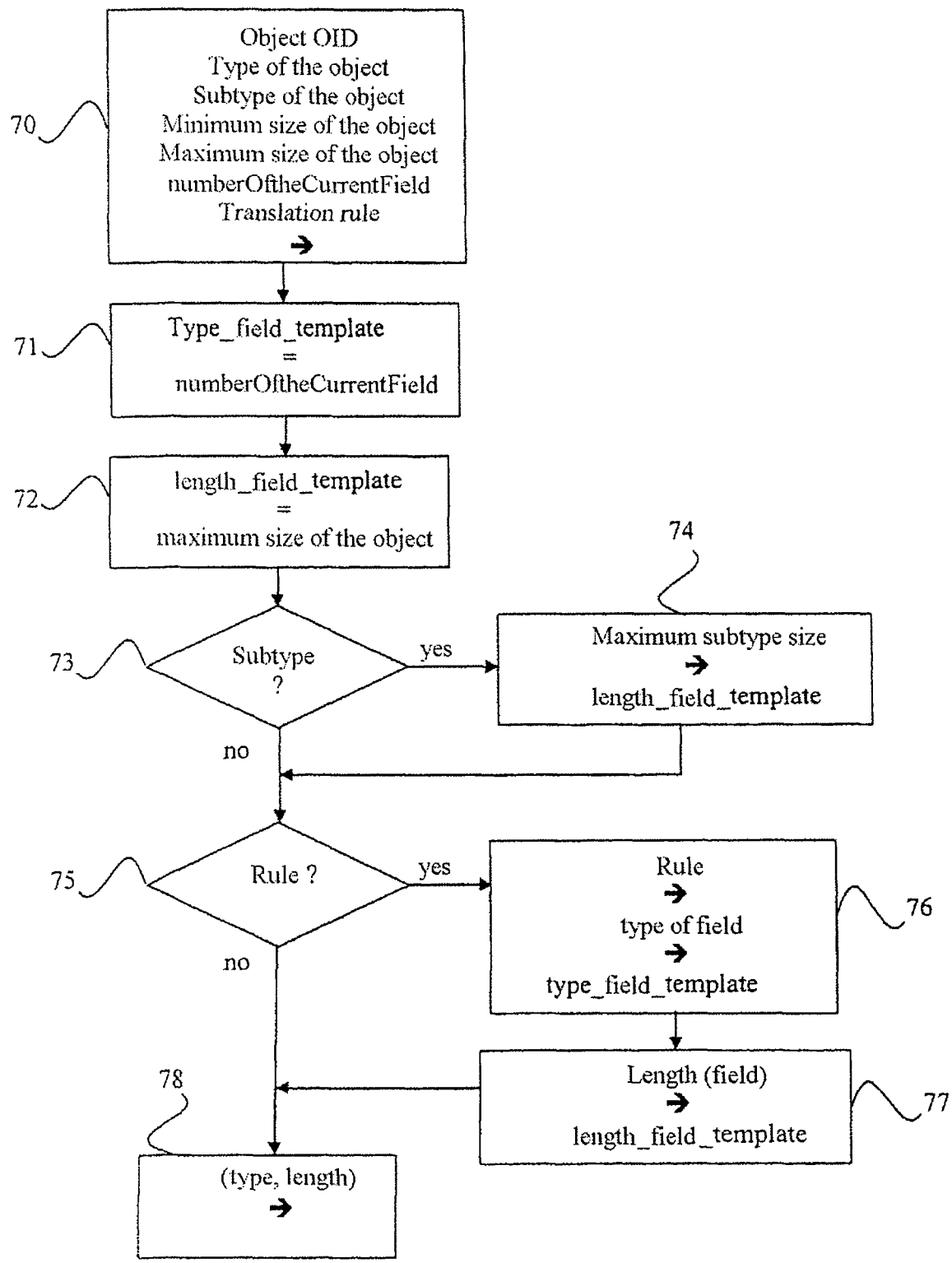

The naming typing module 13 executes the method described hereinafter with reference to FIG. 7.

In a step 70, the module 13 receives the OID of the object, the type of the object, the subtype of the object, the minimum size of the object, the maximum size of the object, the NumberOftheCurrentField and the translation rule which were transmitted to it by the translator 10 in step 7 of the scalar procedure.

In a step 71, the module 13 creates a variable named "Type_field_template" and assigns it the NumberOftheCurrentField received at step 70. This step allows the module 13 to transmit a default type which is the current field number in the standard template.

In a step 72, the module 13 creates a variable named length_field_template and assigns it the maximum size of the object received at step 70. This step allows the module 13 to transmit a default length which is the maximum length that a field can have for the current object.

In a step 73, the module 13 tests whether there exists an SMI subtype for the current object. A positive response to the test triggers a step 74 and a negative response to the test triggers a step 75.

In step 74, the module 13 determines the maximum length of the SMI subtype and assigns this length to the length_field_template variable.

Step 75 consists in testing whether a translation rule associates a template field type with the object corresponding to the OID received or its SMI type or its SMI subtype. A positive response to the test triggers a step 76. A negative response to the test triggers a step 78.

In step 76, the module 13 then assigns the field type afforded by the rule, to the "type_field_template" variable.

In a step 77, the module 13 assigns the length of this field type, to the variable named "length_field_template". Moreover, if there exists a translation rule associating a length restriction with the object corresponding to the OID received, then this length is assigned to the "length_field_template" variable.

In step 78, the module 13 transmits a pair (type, length) whose first value is that of the "type_field_template" variable and whose second value is that of the "length_field_template" variable to the translator 10.

The method in action will now be described on the basis of an exemplary object which is a known table "bufferControlTable" with reference to FIGS. 8 to 10 and of an exemplary object which is another known table "Aa15VccTable" with reference to FIGS. 11 to 13.

FIG. 8 is a tree representation for an MIB table whose annexe 1 gives an SMI definition extract that can be found in greater detail on pages 75 to 77 of RFC2819 available at the internet site http://www.ietf.org.

The first column on the left of the array gives a node number (OID for Object Identifier) referencing an object named in the second column with its type in the third column and its length in the fourth column. The last column on the right gives a length of subtype if one exists. The string of first figures of the node number 1.3.6.1.2.16 gives the location of an MIB 11 in the tree arrangement of MIBs. The next figure 8.1. indicates the location of the "BufferControlTable" object in this MIB. The tree arrangement of the objects of the table is given by the figures 1.1 to 1.13.

The tree or subtree represented in FIG. 8 is an example of content of the memory 12, obtained by the translator 10 on the basis of the SMI definition of annexe 1.

FIG. 9 shows an exemplary standard template the generation of which by the method is described hereinafter.

When the translator 10 traverses the tree of the MIB 11 referenced 1.3.6.1.2.1.16.8 in memory 12, it encounters at step 44, the "bufferControlTable" object which is a table referenced 1.3.6.1.2.1.16.8.1 in memory 12. The translator 10 then executes the table procedure for which we assume for example that the "current_template_ID" variable equals 302 at this moment in step 30.

In step 31, the "current_template_ID" variable is set to 303. In step 51, the translator 10 creates the template of FIG. 9, initially empty. It is assumed that in step 19, "Generation_templates_configuration" equals zero for simplicity. In step 23, the "current_template_ID" variable then equals 304. In step 52, the "NumberOftheCurrentField_DefTicket_Table_Ti" variable equals zero.

In step 55, the translator 10 encounters the "bufferControlIndex" object for which it executes the scalar procedure.

In step 48, the "NumberOftheCurrentField_DefTicket_Table_Ti" variable equals 1.

In step 49, the SMI definition of the object gives the type Integer32 with a subtype of maximum size of 2. In step 8, the typing module returns a pair of value (1,2). In step 50, the translator 10 appends the pair (1,2) in the form of two binary numbers 121 each of two bytes to the template of FIG. 9.

Following steps 56 and 57, in step 55, the translator 10 encounters the "bufferControlChannelIndex" object for which it executes the scalar procedure.

In step 48, the "NumberOftheCurrentField_DefTicket_Table_Ti" variable equals 2.

In step 49, the SMI definition of the object gives the type Integer32 with a subtype of maximum size of 2. In step 8, the typing module returns a pair of value (2,2). In step 50, the translator 10 appends the pair (2,2) in the form of two binary numbers 122 each of two bytes to the template of FIG. 9.

Following step 56, the translator 10 again encounters the two previous objects and goes directly to the next object in step 61.

In step 58, the translator 10 encounters the "bufferControlFullStatus" object for which it executes the scalar procedure.

In step 48, the "NumberOftheCurrentField_DefTicket_Table_Ti" variable equals 3.

In step 49, the SMI definition of the object gives the type INTEGER with a subtype of size 2. In step 8, the typing module returns a pair of value (3,2). In step 50, the translator 10 appends the pair (3,2) in the form of two binary words 123 each of two bytes to the template of FIG. 9.

The above explanations can be repeated for each subsequent object of the array of FIG. 8, the translator 10 then appending in step 50, for each encountered in step 58, respectively the pair (4,2), (5,2), (6,2), (7,4), (8,4), (9,4), (10,4), (11,4), (12,32), (13,4) in the respective form of two binary words 124, 125, 126, 127, 128, 129, 130, 131, 132, 133 each of two bytes to the template of FIG. 9.

After reaching the "bufferControlStatus" object in step 60, the template of FIG. 9 is then constituted of a string of pairs of words 121 to 133. The translator 10 executes the closure procedure.

In step 62, the translator 10 appends a pair of binary words 120 to the start of the template. In step 63, the translator 10 assigns the value 302 to the first word and the value 13 to the second word of the pair.

In step 64, the translator 10 appends a pair of binary words 119 to the start of the template. In step 65, the translator 10 assigns the value 2 to the first word and the value 60 to the second word of the pair.

In step 5, the translator 10 records the template such as it ultimately appears in FIG. 9.

The template of FIG. 9 makes it possible to transmit data tickets whose values are contained in rows of the "bufferControlTable" table.

FIG. 10 shows an exemplary data ticket. Let us assume that row 34 of the table gives the following values:

| | |
|---|---:|
| bufferControlIndex = | 34 |
| bufferControlChannelIndex = | 654 |
| bufferControlFullStatus = | 2 |
| bufferControlFullAction = | 542 |
| bufferControlCaptureSliceSize = | 512 |
| bufferControlDownloadSliceSize = | 200 |
| bufferControlDownloadOffset = | 32 |
| bufferControlMaxOctetsRequested = | 100000000 |
| bufferControlMaxOctetsGranted = | 1000000 |
| bufferControlCapturedPackets = | 10000 |
| bufferControlTurnOnTime = | 3454764364 |
| bufferControlOwner = | acme |
| bufferControlStatus = | 3 |

In the corresponding data ticket of FIG. 10, a two-byte word 99 contains the value 302 which references the template of FIG. 9. A two-byte word 100 contains the value 72 which represents the aggregate length of the 13 data fields indicated by the template of FIG. 9 with the two words 99 and 100, i.e. the total length of the data ticket.

Thereafter fields 101 to 106 the length of each of which is given respectively by the second word of the pairs 121 to 126 of the template, contain respectively the values 34, 654, 2, 542, 512 and 200. Fields 107 to 111 the length of each of which is given respectively by the second word of the pairs 127 to 131 of the template, contain the values 32, 100000000, 1000000 and 3454764364. A field 112 the length of which is given by the second word of the pair 132 contains the character string acme for example coded in ASCII. A field 113 the length of which is given by the second word of the pair 133 contains the value 3.

For each field value of the data ticket, the type given by the first word of each of the pairs 121 to 133 of the template allows a recipient of the ticket to recognize which object this value belongs to.

The economy of bandwidth and the simplification of calculation made possible by the use of the data tickets will be noted. The SNMP message header data are ignored. The data ticket of FIG. 10 contains only four header bytes, the first two for referencing the corresponding template and the last two for indicating the length thereof so as to transmit the content of a table row previously obtained by an SNMP Get.

To obtain the same row by SNMP, an interrogation query followed by a response query would have been necessary first. The interrogation query would have required a trio (object identifier+index value, length, value) per object where "object identifier" is the OID of a table field, index value is the value of the BufferControlIndex index for identifying more precisely an instance of the object, that is to say 12*(11+2) bytes i.e. 156 bytes. The response would have required the 30 bytes of values in addition, i.e. 186 bytes.

By comparison of the 72 bytes of the data ticket, SNMP is therefore much more greedy in terms of messages and especially in terms of byte rate since it generates four times as much traffic. It is true that the transfer of data by ticket requires prior transmission of a template which in the previously described example of FIG. 9, represents 60 bytes, cutting the generation of traffic to just a half for a transmission of first ticket by comparison with SNMP. However, one and the same template may be used for successive tickets without needing to be transmitted again, thus reducing the traffic in a proportion of 2 to 4.

FIG. 11 is a tree representation for a table of the MIB ATM whose annexe 2 gives an SMI definition extract that can be found in greater detail on pages 61 to 63 of RFC1695 available at the internet site http://www.ietf.org.

The first column on the left of the array gives a node number referencing an object named in the second column with its type in the third column and its length in the fourth column. The last column gives the length of the subtype, if it exists. The node number in the general tree arrangement of the MIBs, is also called the OID (Object Identifier). The string of first figures of the node number 1.3.6.1.2.1.37 gives the location of the MIB ATM in the tree arrangement of the MIBs. The following figure 1.12 indicates the location of the "aal5VccTable" object in the MIB ATM. A tree arrangement of objects of the table is given by the figures 1.1 to 1.5.

In the SMI specification of annexe 2, the index of the table is constituted by three objects "if Index", aal5VccVpi" and "aal5VccVci". The last two objects belonging to the table considered. The first object belongs to the "ifTable" table of another MIB pertaining to the physical interfaces, known by the name of MIBII and located in the tree arrangement of the MIBs by the figures 1.3.6.1.2.1. The figure 2.2 locates the table in the MIBII the "ifIndex" object for its part is located by the figures 1.1. in the tree arrangement of the "ifTable" table.

On the basis of the SMI definition of Annexe 2 and of the MIB II in step 3, the translator 10 constructs a naming tree in memory 5. This tree is defined on the basis of the figures of the OIDs of FIG. 11.

FIG. 12 shows an exemplary standard template whose generation by the method is described hereinafter.

When the translator 10 traverses the subtree 1.3.6.1.2.1.37 of the tree consisting of the MIB II and of the MIB ATM in memory 12, it encounters in step 44, the "aal5VccTable" object which is a table referenced 1.3.6.1.2.1.37.1.12 in memory 12. The translator 10 then executes the table procedure for which we assume for example that the "current_template_ID" variable equals 303 at this moment in step 30.

In step 31, the "current_template_ID" variable is set to 304. In step 51, the translator 10 creates the template of FIG. 12, initially empty. It is assumed that in step 19, "Generation_templates_configuration" equals zero for simplicity. In step 23, the "current_template_ID" variable then equals 305. In step 52, the "NumberOftheCurrentField_DefTicket_Table_Ti" variable equals zero.

In step 55, the translator 10 encounters the "ifindex" index, first term of the index, for which it executes the scalar procedure.

In step 48, the "NumberOftheCurrentField_DefTicket_Table_Ti" variable equals 1.

In step 49, the SMI definition of the object gives the type INTEGER with a maximum size of 4. In step 8, the typing module returns a pair of value (1,4). In step 50, the translator 10 appends the pair (1,4) in the form of two binary words 81 each of two bytes to the template of FIG. 12.

Following steps 56 and 57, in step 55, the translator 10 encounters the "aal5VccVpi" object, second term of the index, for which it executes the scalar procedure.

In step 48, the "NumberOftheCurrentField_DefTicket_Table_Ti" variable equals 2.

In step 49, the SMI definition of the object gives the type AtmVpIdentifier with a subtype of maximum size 2. In step 8, the typing module returns a pair of value (2,2). In step 50, the translator 10 appends the pair (2,2) in the form of two binary words 82 each of two bytes to the template of FIG. 12.

Following steps 56 and 57, in step 55, the translator 10 encounters the third term of the index, the "aal5VccVci" object for which it executes the scalar procedure.

In step 48, the "NumberOftheCurrentField_DefTicket_Table_Ti" equals 3.

In step 49, the SMI definition of the object gives the type AtmVcIdentifier with a subtype of maximum size 2. In step 8, the typing module returns a pair of value (3,2). In step 50, the translator 10 appends the pair (3,2) in the form of two binary words 83 each of two bytes to the template of FIG. 12.

Following step 56, the translator 10 again encounters the three previous objects and goes each time directly to the next object in step 61 passing through steps 58, 59, 60 and 61.

In step 58, the translator 10 encounters the "aal5VccCrcErrors" object for which it executes the scalar procedure.

In step 48, the "NumberOftheCurrentField_DefTicket_Table_Ti" variable equals 4.

In step 49, the SMI definition of the object gives the type Counter32 with a maximum size of 4. In step 8, the typing module returns a pair of value (4,4). In step 50, the translator 10 appends the pair (4,4) in the form of two binary words 84 each of two bytes to the template of FIG. 12.

The above explanations may be repeated for each subsequent object of the array of FIG. 11, the translator 10 then appending in step 50, for each one encountered in step 58, respectively the pair (5,4), (6,4), in the respective form of two binary words 85, 86, each of two bytes to the template of FIG. 12.

After reaching the "aal5VccOverSizedSDUs" object in step 60, the template of FIG. 12 is then constituted by a series of pairs of words 81 to 86, the translator 10 executes the closure procedure.

In step 62, the translator 10 appends a pair of binary words 80 to the start of the template. In step 63, the translator 10 assigns the value 303 to the first word and the value 6 to the second word of the pair.

In step 64, the translator 10 appends a pair of binary words 79 to the start of the template. In step 65, the translator 10 assigns the value 2 to the first word and the value 32 to the second word of the pair.

In step 5, the translator 10 records the template such as it finally appears in FIG. 12.

The template of FIG. 12 makes it possible to transmit data tickets whose values are contained in rows of the "aa15VccTable". The tickets are generally grouped together in blocks of tickets intended to be sent to a collector.

FIG. 13 shows an exemplary data ticket. Let us assume that the row of the table describing the quality of the traffic of the ATM circuit travelling through the interface 12 and identified as the virtual circuit corresponding to the Vci 1000 of the Vpi 100, gives the following values:

| | |
|---|---|
| ifIndex = | 12 |
| aa15VccVpi | 100 |
| aa15VccVci = | 1000 |
| aa15VccCrcErrors = | 15432 |
| aa15VccSarTimeOuts = | 456 |
| aa15VccOverSizedSDUs = | 567. |

In the corresponding data ticket of FIG. 13, a two-byte word 199 contains the value 303 which references the template of FIG. 12. A two-byte word 200 contains the value 24 which represents the aggregate length of the six data fields indicated by the template of FIG. 9 with the two words 199 and 200, i.e. the total length of the data ticket.

Subsequently fields 201 to 206 the length of each of which is given respectively by the second word of the pairs 81 to 86 of the template, contain respectively the values 12, 100, 1000, 15432, 456 and 567.

For each field value of the data ticket, the type given by the first word of each of the pairs 81 to 86 of the template, allows a recipient of the ticket to recognize which object this value belongs to.

Here again will be noted the economy of bandwidth and the simplification of calculation that is made possible by the use of the data tickets.

Figure 14:
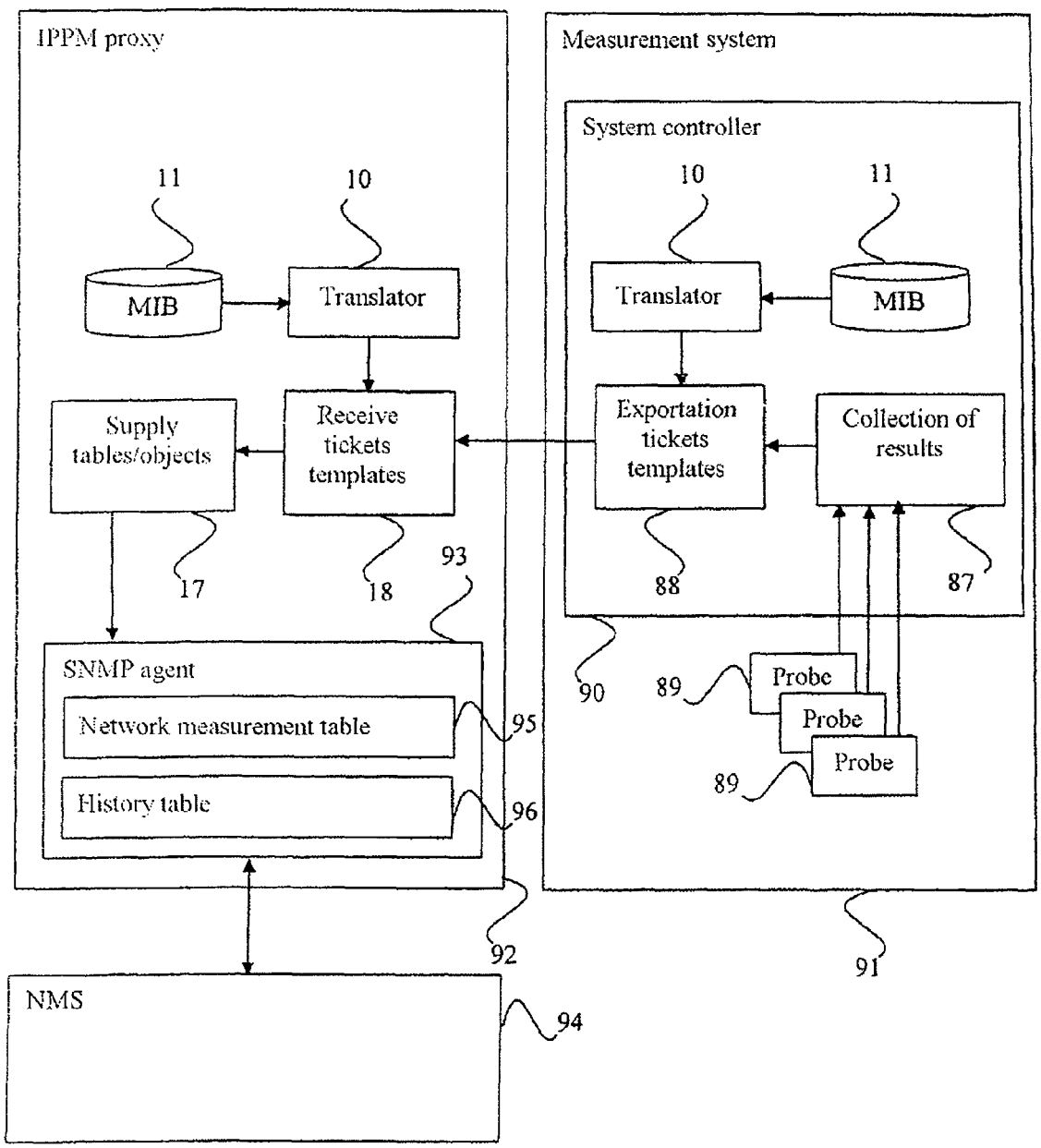
FIG. 14 is a diagram of possible industrial application.

With reference to FIG. 14, a measurement system 91 comprises probes 89 for measuring performance of IP networks and a system controller 90 to which the probes 89 are connected.

An SNMP agent 93 implements the MIB 11 IPPM REPORTING MIB in proxy mode. It is defined in www.ietf.org/html.characters/ippm-character.html. The agent 93 is hosted in a proxy server 92 so as to provide a standard management interface for the measurement system 91, to network management systems 94 (NMS standing for Network Management Station) which can then consult the measurements in progress and their results using the SNMP conventional protocol.

It is understood that the known management interface IPPM REPORTING MIB defines several tables whose ippmNetworkMeasureTable and ippmHistoryTable tables are adopted here by way of example to illustrate an industrial use of the method which is the subject of the invention. The network measurement table 95 named ippmNetworkTable carries definitions of measurements set in place between the probes by a supervisor 87 hosted in the controller 90. The supervisor 87 performs the collection of the results of the measurements originating from the probes 89. The history table 96 named ippmHistoryTable stores the results of the measurements received from the supervisor. The agent 93 comprises a copy of these two tables among others.

So as to be able to use the method described previously, the system 90 is in accordance with the representation of FIG. 1. Found again in FIG. 14 is the translator 10 and the MIB specification 11. Here, the function of the translator 10 among other things is to generate templates for the ippmNetworkTable and ippmHistoryTable tables.

The system 91 also comprises a module 88 for exporting templates and data tickets. The proxy server 92 comprises a module 18 for receiving templates and data tickets. To communicate, the modules 18 and 88 use a protocol named IPFIX, specially adapted for the exchanges of templates and of tickets between modules.

The proxy server 92 also comprises or has access to an instance of the translator 10 and of the MIB 11. Thus when the system 91 despatches a template to the proxy server 92 by means of the module 88, the proxy server 92 receiving this template by means of the module 18, can prepare itself to receive data tickets containing the descriptions and the results of measurements issued following the template by the system 91. The proxy server 92 comprises a module 17 which is enabled by the translator 10 to match up the fields of the template with the SMI definitions of objects so as to supply the agent 93 with tables and with objects in agreement with the values which will be received in the data tickets.

Subsequently, the measurement system 91 uses the IPFX protocol to handover with the flow the measurements put in place and the results of these measurements, to the proxy server 92. The station 94 can then receive the measurements of the agent 93 in a conventional manner via the SNMP protocol.

FIG. 15 gives an exemplary template of the ippmHistoryTable table obtained in the system 91 by means of the method described previously. Here the values in the various fields are expressed in decimals so as to facilitate fast reading thereof, given that in reality they are expressed in binary form.

The first and the second word of the pair 139 contain respectively the value 2 to indicate that the data structure is a template and the value 36 indicating in bytes the length of the template.

The first and the second word of the pair 140 contain respectively the value 304 to indicate that the template pertains to the history table and the value 7 indicating the quantity of data fields of the template.

The first and the second word of the pair 141 pertaining to the "ippmHistoryMeasureOwner" object, contain respectively the value 1 to indicate the field type and the value 32 indicating in bytes the length of the field.

The first and the second word of the pair 142 pertaining to the "ippmHistoryMeasureIndex" object, contain respectively the value 2 to indicate the field type and the value 4 indicating in bytes the length of the field.

The first and the second word of the pair 143 pertaining to the "ippmHistoryMetricIndex" object, contain respectively the value 3 to indicate the field type and the value 4 indicating in bytes the length of the field.

The first and the second word of the pair 144 pertaining to the "ippmHistoryIndex" object, contain respectively the value 4 to indicate the field type and the value 4 indicating in bytes the length of the field.

The first and the second word of the pair 145 pertaining to the "ippmHistorySequence" object, contain respectively the value 5 to indicate the field type and the value 4 indicating in bytes the length of the field.

The first and the second word of the pair 146 pertaining to the "ippmHistoryTimestamp" object, contain respectively the value 6 to indicate the field type and the value 8 indicating in bytes the length of the field.

The first and the second word of the pair 147 pertaining to the "ippmHistoryValue" object, contain respectively the value 7 to indicate the field type and the value 4 indicating in bytes the length of the field.

FIG. 16 gives an exemplary data ticket of the ippmHistoryTable table obtained in the system 91 so as to be readable by means of the template of FIG. 15. As is the case for the other template or data ticket drawings, a line width represents four bytes, a line height is not however proportional to the number of bytes for a field of more than eight bytes so that the representation of the drawing can be kept to a reasonable number of pages.

The first field 149 contains on two bytes, the value 304 which is that of the first word of the pair 140 in the corresponding template.

The second field 150 contains on two bytes the value 64 to indicate the quantity of bytes of the data ticket.

The field 151 pertaining to the "ippmHistoryMeasureOwner" object, contains the character string FTRD coded in binary.

The field 152 pertaining to the "ippmHistoryMeasureIndex" object, contains the value 5 which indexes the measurement and the value 6 which indexes a simple outward delay.

The field 153 pertaining to the "ippmHistoryMetricIndex" object, contains the value 6 which indexes the type of metric measured, on this occasion 6 corresponds to a unidirectional delay.

The field 154 pertaining to the "ippmHistoryIndex" object, contains the value 123 to indicate that the result of the measurement transmitted in this ticket, is the $123^{rd}$.

The field 155 pertaining to the "ippmHistorySequence" object, contains the value 1057582058 to indicate that the measurement was taken on 14 Oct. 2002 at 9 hours 54 minutes 18 seconds.

The field 156 pertaining to the "ippmHistoryTimestamp" object, contains the value 4578845678 representative of a time stamping fractional share.

The field 157 pertaining to the "ippmHistoryValue" object, contains the value 567 which is that of the delay measurement, the unit being given by the field 152.

Figure 17:
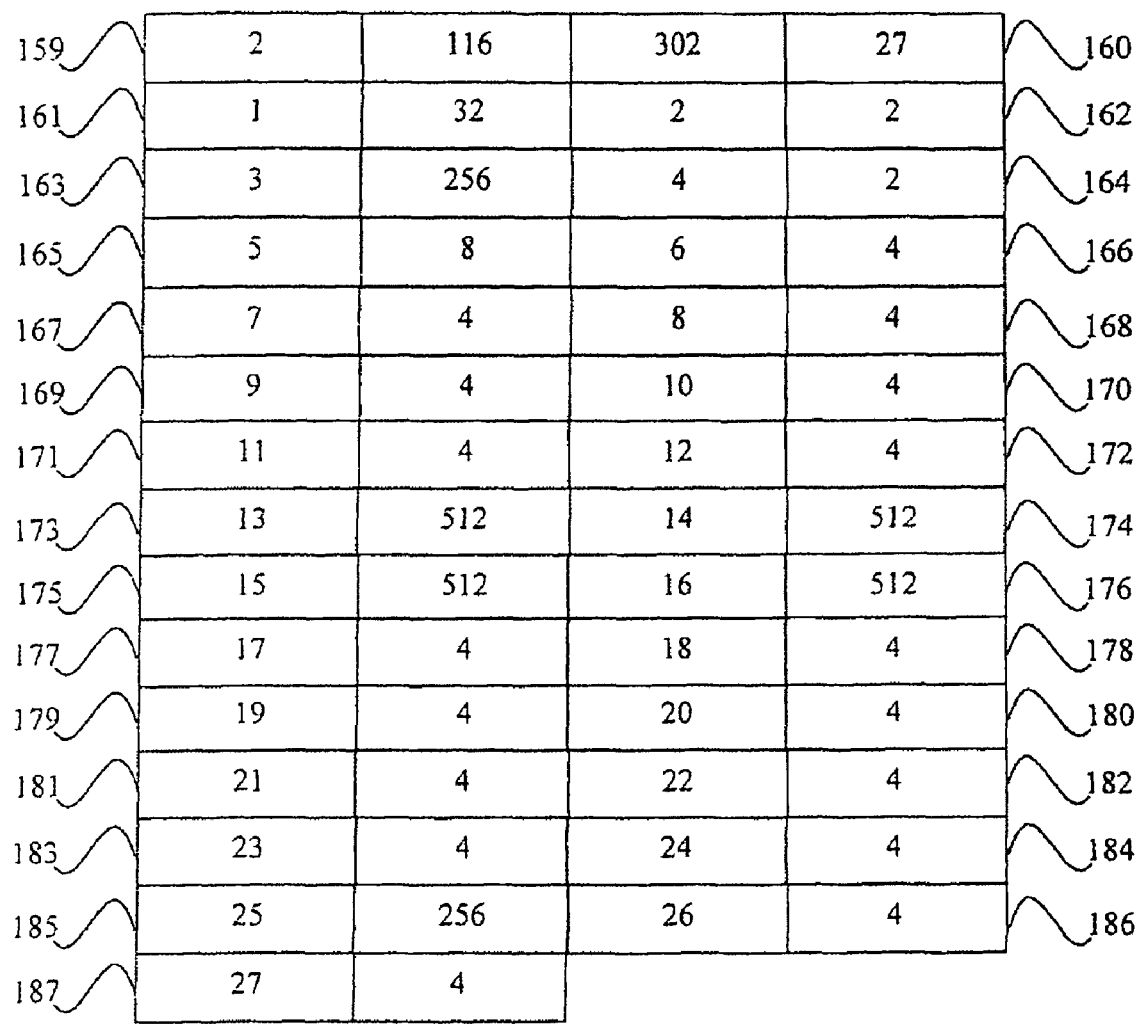
FIG. 17 shows another table template generated by the system of FIG. 14.

FIG. 17 gives an exemplary template of the ippmNetworkTable table obtained in the system 91 by means of the method described previously. Here again the values in the various fields are expressed in decimals so as to facilitate fast reading thereof, given that in reality they are expressed in binary form.

The first and the second word of the pair 159 contain respectively the value 2 to indicate that the data structure is an MIB template and the value 116 indicating in bytes the length of the template.

The first and the second word of the pair 160 contain respectively the value 302 to indicate that the template pertains to the table of network measurements and the value 27 indicating the quantity of data fields formatted by the template.

The first and the second word of the pair 161 pertaining to the "ippmNetworkMeasureOwner" object, contain respectively the value 1 to indicate the field type and the value 32 indicating in bytes the length of the field.

The first and the second word of the pair 162 pertaining to the "ippmNetworkMeasureIndex" object, contain respectively the value 2 to indicate the field type and the value 2 indicating in bytes the length of the field.

The first and the second word of the pair 163 pertaining to the "ippmNetworkMetricName" object, contain respectively the value 3 to indicate the field type and the value 256 indicating in bytes the length of the field.

The first and the second word of the pair 164 pertaining to the "ippmNetworkMeasureMetrics" object, contain respectively the value 4 to indicate the field type and the value 8 indicating in bytes the length of the field.

The first and the second word of the pair 165 pertaining to the "ippmNetworkMeasureBeginTime" object, contain respectively the value 5 to indicate the field type and the value 4 indicating in bytes the length of the field.

The first and the second word of the pair 166 pertaining to the "ippmNetworkMeasureCollectionRateUnit" object, contain respectively the value 6 to indicate the field type and the value 4 indicating in bytes the length of the field.

The first and the second word of the pair 167 pertaining to the "ippmNetworkMeasureCollectionRate" object, contain respectively the value 7 to indicate the field type and the value 4 indicating in bytes the length of the field.

The first and the second word of the pair 168 pertaining to the "ippmNetworkMeasureDurationUnit" object, contain respectively the value 8 to indicate the field type and the value 4 indicating in bytes the length of the field.

The first and the second word of the pair 169 pertaining to the "ippmNetworkMeasureDuration" object, contain respectively the value 9 to indicate the field type and the value 4 indicating in bytes the length of the field.

The first and the second word of the pair 170 pertaining to the "ippmNetworkMeasureHistorySize" object, contain respectively the value 10 to indicate the field type and the value 4 indicating in bytes the length of the field.

The first and the second word of the pair 171 pertaining to the "ippmNetworkMeasureFailureMgmtMode" object, contain respectively the value 11 to indicate the field type and the value 4 indicating in bytes the length of the field.

The first and the second word of the pair 172 pertaining to the "ippmNetworkMeasureResultsMgmt" object, contain respectively the value 12 to indicate the field type and the value 4 indicating in bytes the length of the field.

The first and the second word of the pair 173 pertaining to the "ippmNetworkMeasureScrcTypeP" object, contain respectively the value 13 to indicate the field type and the value 512 indicating in bytes the length of the field.

The first and the second word of the pair 174 pertaining to the "ippmNetworkMeasureScrc" object, contain respectively the value 14 to indicate the field type and the value 512 indicating in bytes the length of the field.

The first and the second word of the pair 175 pertaining to the "ippmNetworkMeasureDstTypeP" object, contain respectively the value 15 to indicate the field type and the value 512 indicating in bytes the length of the field.

The first and the second word of the pair 176 pertaining to the "ippmNetworkMeasureDst" object, contain respectively the value 16 to indicate the field type and the value 512 indicating in bytes the length of the field.

The first and the second word of the pair 177 pertaining to the "ippmNetworkMeasureTransmitMode" object, contain respectively the value 17 to indicate the field type and the value 4 indicating in bytes the length of the field.

The first and the second word of the pair 178 pertaining to the "ippmNetworkMeasureTransmitPacketRateUnit" object, contain respectively the value 18 to indicate the field type and the value 4 indicating in bytes the length of the field.

The first and the second word of the pair 179 pertaining to the "ippmNetworkMeasureTransmitPacketRate" object, contain respectively the value 19 to indicate the field type and the value 4 indicating in bytes the length of the field.

The first and the second word of the pair 180 pertaining to the "ippmNetworkMeasureDeviationOrBurstsize" object, contain respectively the value 20 to indicate the field type and the value 4 indicating in bytes the length of the field.

The first and the second word of the pair 181 pertaining to the "ippmNetworkMeasureMedianOrInterBurstsize" object, contain respectively the value 21 to indicate the field type and the value 4 indicating in bytes the length of the field.

The first and the second word of the pair 182 pertaining to the "ippmNetworkMeasureLossTimeout" object, contain respectively the value 22 to indicate the field type and the value 4 indicating in bytes the length of the field.

The first and the second word of the pair 183 pertaining to the "ippmNetworkMeasureL3PacketSize" object, contain respectively the value 23 to indicate the field type and the value 4 indicating in bytes the length of the field.

The first and the second word of the pair 184 pertaining to the "ippmNetworkMeasureDataPattern" object, contain respectively the value 24 to indicate the field type and the value 4 indicating in bytes the length of the field.

The first and the second word of the pair 185 pertaining to the "ippmNetworkMeasureMap" object, contain respectively the value 25 to indicate the field type and the value 256 indicating in bytes the length of the field.

The first and the second word of the pair 186 pertaining to the "ippmNetworkMeasureSingletons" object, contain respectively the value 26 to indicate the field type and the value 4 indicating in bytes the length of the field.

The first and the second word of the pair 187 pertaining to the "ippmNetworkMeasureoperState" object, contain respectively the value 27 to indicate the field type and the value 4 indicating in bytes the length of the field.

Figure 18A:
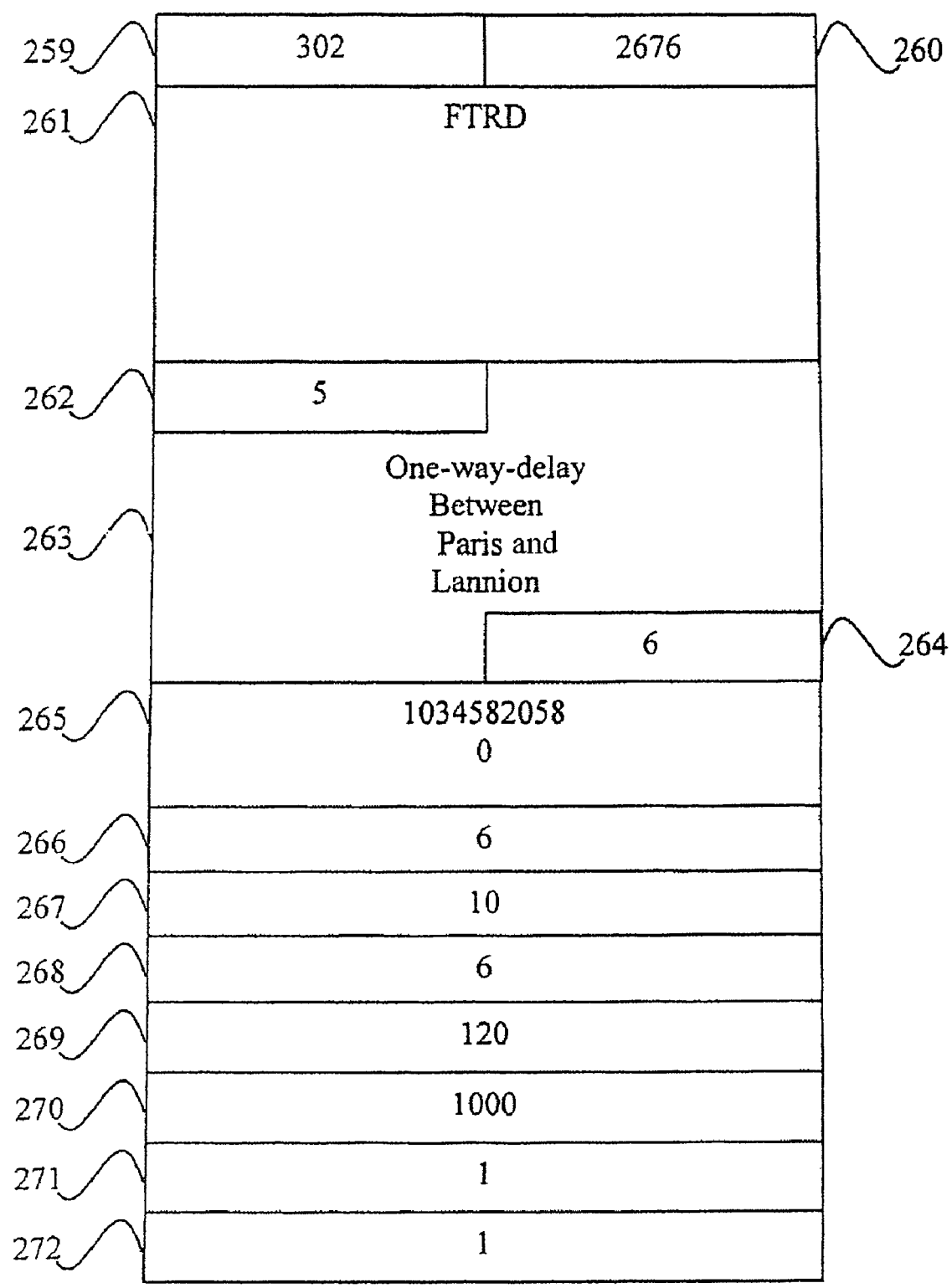
FIGS. 18a to 18c show an exemplary data ticket, in accordance with the template of FIG. 17.
Figure 18B:
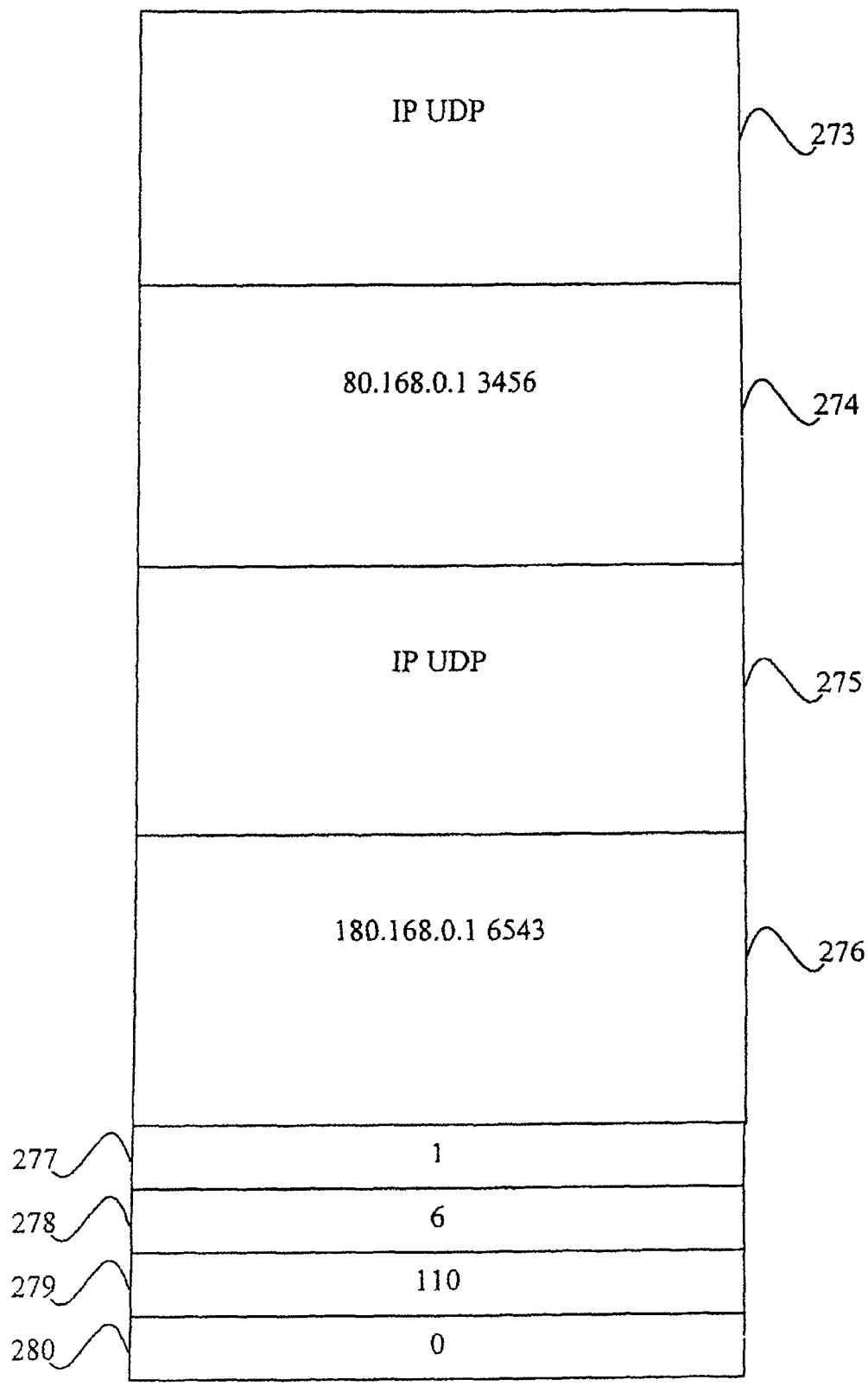
Figure 18C:
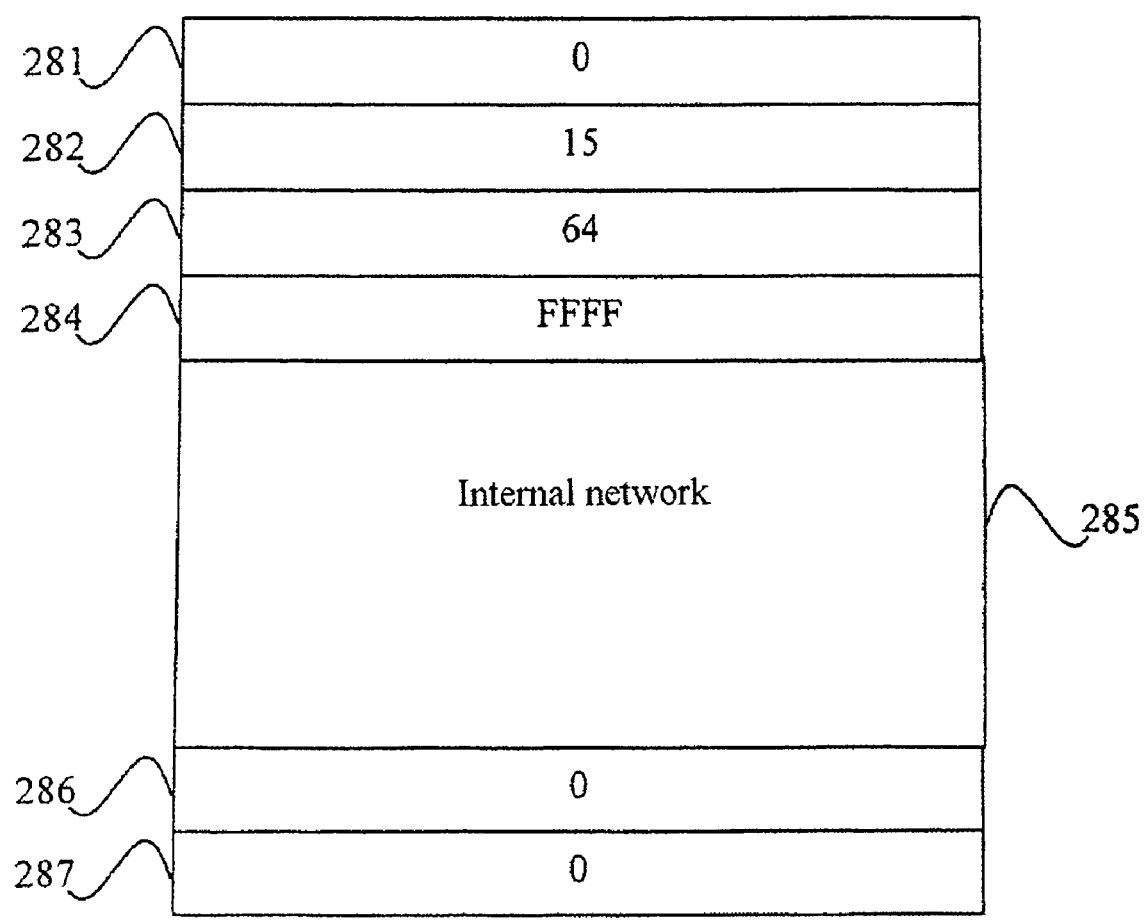

FIG. 18 gives an exemplary data ticket of the ippmNetworkTable table obtained in the system 91 so as to be readable by means of the template of FIG. 17.

The first field 259 contains the value 302 which is that of the first word of the pair 159 in the corresponding template.

The second field 260 contains the value 2676 to indicate the ticket length expressed in bytes.

The field 261 pertaining to the "ippmNetworkMeasureOwner" object, contains the character string FTRD coded in binary to indicate the proprietor of the measurement.

The field 262 pertaining to the "ippmNetworkMeasureIndex" object, contains the value 5 to indicate the measurement number.

The field 263 pertaining to the "ippmNetworkMetricName" object, contains the character string "One-way-delay between Paris and Lannion" coded in binary to indicate in plain text what the measurement refers to.

The field 264 pertaining to the "ippmNetworkMeasureMetrics" object, contains the value 6 to indicate the type of measurement.

The field 265 pertaining to the "ippmNetworkMeasureBeginTime" object, contains the value 1034582058 to indicate that the measurement started on 14 Sep. 2003 at 9 hours 54 minutes 18 seconds.

The field 266 pertaining to the "ippmNetworkMeasureCollectionRateUnit" object, contains the value 0 representative of a time stamping fractional share.

The field 267 pertaining to the "ippmNetworkMeasureCollectionRate" object, contains the value 10 to indicate the sampling rate.

The field 268 pertaining to the "ippmNetworkMeasureDurationUnit" object, contains the value 6 to indicate that the unit of duration of the measurement is a second.

The field 269 pertaining to the "ippmNetworkMeasureDuration" object, contains the value 120 to indicate that the measurement lasted 120 seconds.

The field 270 pertaining to the "ippmNetworkMeasureHistorySize" object, contains the value 1000 to indicate the size of the measurement history.

The field 271 pertaining to the "ippmNetworkMeasureFailureMgmtMode" object, contains the value 1 to indicate the automatic mode.

The field 272 pertaining to the "ippmNetworkMeasureResultsMgmt" object, contains the value 1 to indicate that the results are communicated with automatic looping.

The field 273 pertaining to the "ippmNetworkMeasureScrcTypeP" object, contains the character string "IP UDP" to indicate the transfer protocol used by the communication on departure from Paris which forms the subject of the measurement.

The field 274 pertaining to the "ippmNetworkMeasureScrc" object, contains the value 80.168.0.1 3456 to indicate the source address of the communication, here Paris.

The field 275 pertaining to the "ippmNetworkMeasureDstTypeP" object, contains the character string "IP UDP" to indicate the transfer protocol used by the communication destined for Lannion which forms the subject of the measurement.

The field 276 pertaining to the "ippmNetworkMeasureDst" object, contains the value 180.168.0.1 6543 to indicate the destination address of the communication, here Lannion.

The field 277 pertaining to the "ippmNetworkMeasureTransmitMode" object, contains the value 1 to indicate that the mode of transmission is periodic.

The field 278 pertaining to the "ippmNetworkMeasureTransmitPacketRateUnit" object, contains the value 6 to indicate that the packet rate unit of 64 bytes transmitted, is per second.

The field 279 pertaining to the "ippmNetworkMeasureTransmitPacketRate" object, contains the value 100 to indicate that the sending rate was 100 packets per second.

The field 280 pertaining to the "ippmNetworkMeasureDeviationOrBurstsize" object, contains the value of 0 to indicate a zero deviation.

The field 281 pertaining to the "ippmNetworkMeasureMedianOrInterBurstsize" object, contains the value 0 to indicate a zero burst size.

The field 282 pertaining to the "ippmNetworkMeasureLossTimeout" object, contains the value 15 to indicate that the delay on expiry of which a packet is considered to be lost, is 15 seconds.

The field 283 pertaining to the "ippmNetworkMeasureL3PacketSize" object, contains the value 64 to indicate that the size of the packets sent in the communication which forms the subject of the measurement, is 64 bytes.

The field 284 pertaining to the "ippmNetworkMeasureDataPattern" object, contains the value FFFF to indicate the format of the measurement data.

The field 285 pertaining to the "ippmNetworkMeasureMap" object, contains the character string "internal network" to indicate in plain text the type of network.

The field 286 pertaining to the "ippmNetworkMeasureSingletons" object, contains the value 0 by default.

The field 287 pertaining to the "ippmNetworkMeasureOperState" object, contains the value 0 by default.

The person skilled in the art will readily appreciate the economy of bandwidth necessary for the transferring of the measurements between the system 91 and the server 92, on the basis of the two examples of data tickets which have just been described, by comparison with that which would have been necessary using the SNMP protocol at this level.

The method implemented in the system described, according to the invention, is especially useful since it makes it possible to automatically generate templates on the basis of MIBs or PIBs for any type of data structure, relieving the human being of irksome tasks which in the absence of the invention, would have consisted in manually defining a template for each particular data structure, the quantity of possible data structures in this field being considerable.

Annex 1

```
bufferControlTable OBJECT-TYPE
    SYNTAX SEQUENCE OF {
        bufferControlIndex              Integer32,
        bufferControlChannelIndex       Integer32,
        bufferControlFullStatus         INTEGER,
        bufferControlFullAction         INTEGER,
        bufferControlCaptureSliceSize   Integer32,
        bufferControlDownloadSliceSize  Integer32,
        bufferControlDownloadOffset     Integer32,
        bufferControlMaxOctetsRequested Integer32,
        bufferControlMaxOctetsGranted   Integer32,
        bufferControlCapturedPackets    Integer32,
        bufferControlTurnOnTime         TimeTicks,
        bufferControlOwner              OwnerString,
        bufferControlStatus             EntryStatus
    }
    INDEX {bufferControlIndex}
        ::={capture 1}
```

Annex 2

```
aal5VccTable OBJECT-TYPE
    SYNTAX SEQUENCE OF {
        aal5VccVpi              INTEGER,
        aal5VccVci              INTEGER,
        aal5VccCrcErrors        Counter32,
        aal5VccSarTimeOuts      Counter32,
        aal5VccOverSizedSDUs    Counter32
    }
    INDEX {ifIndex, aal5VccVpi, aal5VccVci}
        ::= {atmMIBObjects 1}
```

The invention claimed is:

1. A method for minimizing a bandwidth required for a transfer of communication network administration information, said information relating to objects pertaining to hardware, software or network operation elements, catalogued in an administration information base and with each of which is associated a formal language specification, comprising the steps of:
generating on a basis of a formal language specification for each object, a pair of words for which a value of first word pertains to an indication of the object and a value of second word pertains to an information length of the object;
constructing a template comprising an ordered set of pairs of words generated and an identifier of said template, said template indicating an ordered string of information to be sent;
exporting said template; and
progressively exporting the ordered string of information corresponding to said template, said ordered string of information corresponding to said communication network administration information relating to said object.

2. The method as claimed in claim 1, further comprising the steps of:
traversing a tree of the administration information base each node of which is associated with an object;
testing at each node whether the object is of scalar or table type;
constructing the template by appending the word pair generated to the template if the object is of scalar type;
constructing template if the object is of table type for the objects of the table.

3. The method as claimed in claim 1, further comprising the step of constructing a configuration template comprising the pairs of words generated for objects with modifiable access.

4. A method of transmitting communication network administration information, said information relating to objects pertaining to hardware, software or network operation elements, catalogued in an administration information base and with each of which is associated a formal language specification, comprising the steps of:
obtaining a template comprising an identifier of said template and an ordered set of pairs of words, each pair of words being generated for one of said objects on a basis of a formal language specification associated with said object and comprising a first word having a value pertaining to an indication of said object and a second word having a value pertaining to an information length of said object;
exporting said template; and
progressively exporting an ordered string of information corresponding to said template, said ordered string of information corresponding to said communication network administration information relating to said object.

5. A system for minimizing a bandwidth required for a transfer of communication network administration information, said information relating to objects pertaining to hardware, software or network operation elements, catalogued in an administration information base and with each of which is associated a formal language specification, said system comprising: a translator machine configured:
to generate on a basis of a formal language specification for each object, a pair of words a value of whose first word pertains to an indication of the object and a value of whose second word pertains to an information length of the object;
to generate a template comprising an ordered set of pairs of words and an identifier, said template indicating an ordered string of information to be sent;
to export said template; and
to progressively export the ordered string of information corresponding to said template, said ordered string of information corresponding to said communication network administration information relating to said object.

6. The system as claimed in claim 5, wherein the translator module is designed to traverse a tree of the administration information base each node of which is associated with an object, to test at each node whether the object is of scalar or table type and to construct the template by appending the word pair generated to the template if the object is of scalar type or construct another so-called table template if the object is of table type for the objects of the table.

7. The system as claimed in claim 5 wherein the translator module is designed to construct in addition a configuration template comprising the pairs of words generated for objects with modifiable access.

8. The system as claimed in claim 5, further comprising a supervisor module designed to collect measurements and an exportation module designed to transmit at least one ticket of data pertaining to these measurements to a server.

9. The system as claimed in claim 8, wherein said exportation module is designed to transmit:
a data ticket comprising a reference to a template, preceded, in the transmission, by the template referenced in said data ticket.

10. A computer-readable memory having stored thereon a program executable by a processor for performing a method, the program including:
an exportation module for a system for minimizing a bandwidth required for a transfer of communication network administration information, said information relating to objects pertaining to hardware, software or network operation elements, catalogued in an administration information base and with each of which is associated a formal language specification;
program codes for generating a template comprising:
an ordered set of pairs of words; and
an identifier; and
a supervisor module to carry out measurements,
wherein said exportation module comprises means for transmitting at least one ticket of data pertaining to measurements carried out by said supervisor module to a server, said ticket of data being according to said template and data being related to said communication network administration information.

11. The computer-readable memory as claimed in claim 10, wherein said exportation module is designed to transmit:
a data ticket comprising a reference to a template,
preceded, in the transmission, by the template referenced in said data ticket.

* * * * *